United States Patent
Ito et al.

(10) Patent No.: US 9,444,311 B2
(45) Date of Patent: Sep. 13, 2016

(54) ELECTRIC DRIVING DEVICE AND METHOD FOR MANUFACTURING ELECTRIC DRIVING DEVICE

(75) Inventors: Shinichi Ito, Tokyo (JP); Isao Sonoda, Tokyo (JP); Tadayuki Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 23 days.

(21) Appl. No.: 14/413,082

(22) PCT Filed: Aug. 28, 2012

(86) PCT No.: PCT/JP2012/071688
§ 371 (c)(1),
(2), (4) Date: Jan. 6, 2015

(87) PCT Pub. No.: WO2014/033833
PCT Pub. Date: Mar. 6, 2014

(65) Prior Publication Data
US 2015/0171709 A1    Jun. 18, 2015

(51) Int. Cl.
*H02K 5/22* (2006.01)
*H02K 9/22* (2006.01)
*H02K 15/14* (2006.01)

(52) U.S. Cl.
CPC ............... *H02K 9/22* (2013.01); *H02K 5/225* (2013.01); *H02K 11/33* (2016.01); *H02K 15/14* (2013.01); *Y10T 29/49009* (2015.01)

(58) Field of Classification Search
CPC ......... B62D 5/04; H02K 5/16; H02K 23/31; H02K 25/11; H02K 5/22; H02K 7/11; H02K 9/00; H02K 9/22; H02K 11/00; H02K 11/02; H02K 11/22; H02K 11/33; H02K 11/38; H02K 15/14; H02K 29/08
See application file for complete search history.

(56) References Cited

U.S. PATENT DOCUMENTS 6,577,030 B2 *   6/2003   Tominaga ............ B62D 5/0406
                                                  310/64
6,707,185 B2 *   3/2004   Hemmi ................ B62D 5/0406
                                                  310/68 B (Continued)

FOREIGN PATENT DOCUMENTS

EP   1955927 A1   8/2008
EP   2371673 A2   10/2011

(Continued)

OTHER PUBLICATIONS

International Search Report of PCT/JP2012/071688, dated Nov. 6, 2012. [PCT/ISA/210].

(Continued)

*Primary Examiner* — Tran Nguyen
(74) *Attorney, Agent, or Firm* — Sughrue Mion, PLLC

(57) ABSTRACT

Provided is an electric driving device including an electric motor (1), and a control device (20) arranged on an axis line of a rotation shaft (2) of the electric motor, for controlling the electric motor. The electric motor includes a motor terminal (13) extending toward the control device in parallel to a direction of the axis line of the rotation shaft, and a slit (13*a*) is formed at an end portion of the motor terminal on the control device side. The control device includes a motor connection terminal (34) formed on an extension line of the motor terminal and connected to the motor terminal. The slit of the motor terminal is press-fitted and fixed to the motor connection terminal, and an insulating member (33) for holding the motor connection terminal is fixed to the heat sink (35).

14 Claims, 15 Drawing Sheets

(56) References Cited

U.S. PATENT DOCUMENTS

| | | | | |
|---|---|---|---|---|
| 7,621,367 | B2* | 11/2009 | Tominaga | B62D 5/0406 180/444 |
| 8,198,763 | B2* | 6/2012 | Kato | H02K 11/048 310/62 |
| 2010/0327677 | A1* | 12/2010 | Iwai | H01L 23/3107 310/64 |
| 2011/0273042 | A1 | 11/2011 | Isoda et al. | |

FOREIGN PATENT DOCUMENTS

| | | |
|---|---|---|
| JP | 2002-223552 A | 8/2002 |
| JP | 2002-345211 A | 11/2002 |
| JP | 2008-206373 A | 9/2008 |
| JP | 2009-248754 A | 10/2009 |
| JP | 2011-130576 A | 6/2011 |
| JP | 2011-217466 A | 10/2011 |
| JP | 2011-239542 A | 11/2011 |
| JP | 2012-143035 A | 7/2012 |
| JP | 2012-143036 A | 7/2012 |

OTHER PUBLICATIONS

Communication dated Mar. 16, 2016 from the European Patent Office issued in corresponding Application No. 12883957.8.

* cited by examiner (a)

(b)

ELECTRIC DRIVING DEVICE AND METHOD FOR MANUFACTURING ELECTRIC DRIVING DEVICE

CROSS REFERENCE TO RELATED APPLICATIONS

This application is a National Stage of International Application No. PCT/JP2012/071688 filed Aug. 28, 2012, the contents of all of which are incorporated herein by reference in their entirety.

TECHNICAL FIELD

The present invention relates to an electric driving device to be used in, for example, an electric power steering device, including an electric motor for outputting assist torque to a steering of a vehicle, and a control device for controlling drive of the electric motor, and to a method of manufacturing an electric driving device.

BACKGROUND ART

There are known related-art electric driving devices including an electric motor for outputting assist torque to a steering of a vehicle, and a control device for controlling drive of the electric motor, in which the control device is mounted on the electric motor (see, for example, Patent Literatures 1 and 2).

In an electric power steering device disclosed in Patent Literature 1, a control unit serving as the control device is arranged on an axis line of a rotation shaft of the electric motor, and is fixed to the electric motor. In this case, a power feeding portion of the electric motor and a joining portion of the control unit are joined to each other inside a housing or a case with screws, which are driven through an opening portion formed in the housing, the case, or in both the housing and the case.

Also in an electric power steering device disclosed in Patent Literature 2, similarly to Patent Literature 1, the control device is arranged on the axis line of the rotation shaft of the electric motor, and is fixed to the electric motor. Note that, in Patent Literature 2, in a process of combining the control device and the electric motor, a motor terminal extending from the electric motor toward the control device in parallel to an axis line direction of the rotation shaft is press-fitted to a control device output terminal formed on an extension line of the motor terminal, to thereby achieve a pressure contact state. In this manner, a power feeding portion of the electric motor and the control device are joined to each other.

CITATION LIST

Patent Literature

[PTL 1] JP 2009-248754 A
[PTL 2] JP 2011-217466 A

SUMMARY OF INVENTION

Technical Problems

However, the following problems are inherent in the related art.

In the electric driving device to be used in the electric power steering device disclosed in Patent Literature 1, the screws are necessary for electrically connecting the power feeding portion of the electric motor and the joining portion of the control device. Further, a space for arranging the screws and a space for inserting a screw fastening tool are also necessary for joining the power feeding portion of the electric motor and the joining portion of the control device with the screws. As a result, the number of components and the number of assembling steps are increased, thus leading to problems of increase in cost and size of the device.

In addition, in the electric driving device of Patent Literature 1, the power feeding portion and the joining portion are joined to each other by screwing through the opening portion with the screw fastening tool. Therefore, there is a risk in that external foreign matters (such as dust and water droplets) may enter the joining region, resulting in failure to secure insulating property of the joining region. Further, there is a risk in that the water droplets may adhere to the joining region to cause rust, resulting in decrease in electric conductivity.

Further, in order to secure the insulating property and the water resistance of the joining region, it is necessary to further close the insertion port for the screw fastening tool with a cover after the screw fastening. As a result, the number of components and the number of assembling steps are further increased, thus leading to a problem of further increase in cost.

In the electric driving device to be used in the electric power steering device disclosed in Patent Literature 2, on the other hand, the control device output terminal is supported in a cantilever manner, and hence, when the motor terminal is press-fitted to the control device output terminal, the control device output terminal is deformed due to a press-fitting load. Thus, there arise problems of decrease in easiness of assembling of the device, and in reliability of the device.

In addition, in the electric driving device of Patent Literature 2, the amount of deformation of the control device output terminal may fluctuate due to a fluctuation of dimensions and an assembling error of components. As a result, the quality of the device becomes unstable, thus leading to a problem of decrease in reliability. Further, the control device output terminal is brought into a floating state, and hence the heat releasing from the terminal becomes insufficient, thus leading to a problem of decrease in motor performance.

The present invention has been made to solve the problems described above, and it is therefore an object of the present invention to provide an electric driving device including an electric motor and a control device, and a method of manufacturing an electric driving device, which are capable of reducing the number of components and the number of assembling steps and enhancing the reliability at the time of joining the electric motor and the control device.

Solution to Problems

According to one embodiment of the present invention, there is provided an electric driving device, including: an electric motor; and a control device arranged on an axis line of a rotation shaft of the electric motor, for controlling drive of the electric motor, the electric motor including a motor terminal extending toward the control device in parallel to a direction of the axis line of the rotation shaft and having a slit formed at an end portion of the motor terminal on the control device side, the control device including: a semiconductor switching element for switching a current of the electric motor; a heat sink for releasing heat generated from the semiconductor switching element; a motor connection terminal formed on an extension line of the motor terminal and electrically connected to the semiconductor switching element and the motor terminal; and an insulating member for holding the motor connection terminal, the motor connection terminal being pinched by the slit formed in the motor terminal so that the motor terminal is fixed in a state of being press-fitted to the motor connection terminal, the insulating member including a resin wall extending substantially in parallel to the axis line of the rotation shaft, for adjusting a position of the motor terminal with respect to the motor connection terminal by arranging the motor terminal on an inner circumferential side of the resin wall, to thereby fix the insulating member to the heat sink.

Further, according to one embodiment of the present invention, there is provided a method of manufacturing an electric driving device, including the steps of: fixing an insulating member to a heat sink; inserting a motor terminal along a resin wall so as to adjust a position of the motor terminal with respect to a motor connection terminal; and pinching the motor connection terminal by a slit formed in the motor terminal so that the motor terminal is fixed in a state of being press-fitted to the motor connection terminal.

Advantageous Effects of Invention

According to one embodiment of the present invention, there is no need to use the screws for electrically connecting the power feeding portion of the electric motor and the joining portion of the control device to each other. In addition, the load that may be applied when press-fitting and fixing the motor terminal and the motor connection terminal to each other is borne by the heat sink. Besides, the motor connection terminal is fixed to the heat sink through intermediation of the insulating member, and is held by the motor terminal under pressure. Thus, it is possible to provide the electric driving device including the electric motor and the control device, and the method of manufacturing an electric driving device, which are capable of reducing the number of components and the number of assembling steps and enhancing the reliability at the time of joining the electric motor and the control device to each other.

DESCRIPTION OF EMBODIMENTS

Figure 1:
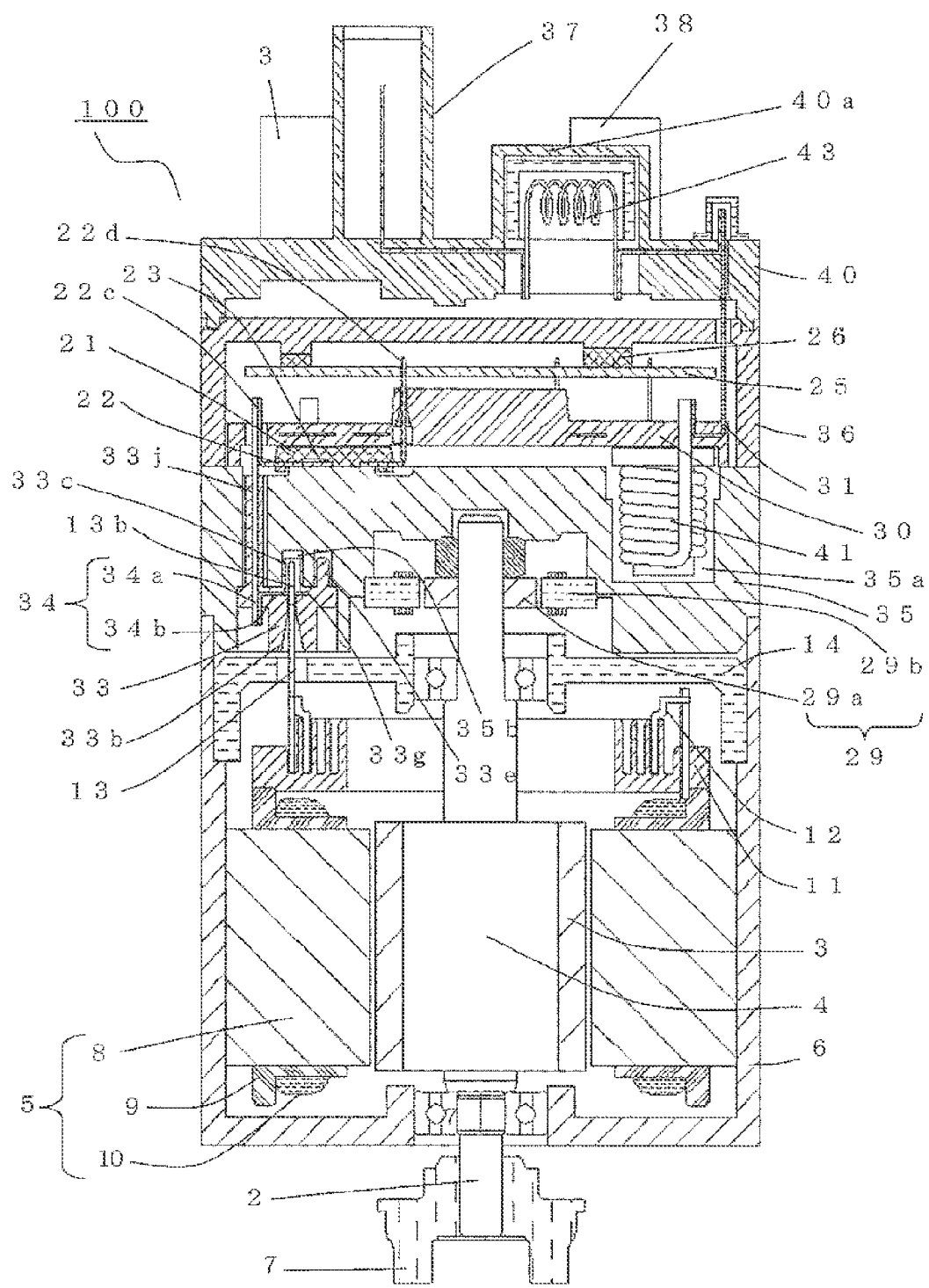
FIG. 1 is a sectional view illustrating an electric driving device according to a first embodiment of the present invention.

Referring to the drawings, an electric driving device and a method of manufacturing an electric driving device according to exemplary embodiments of the present invention are described below. In the drawings, the same or corresponding components and parts are denoted by the same reference symbols for description.

First Embodiment

Figure 2:
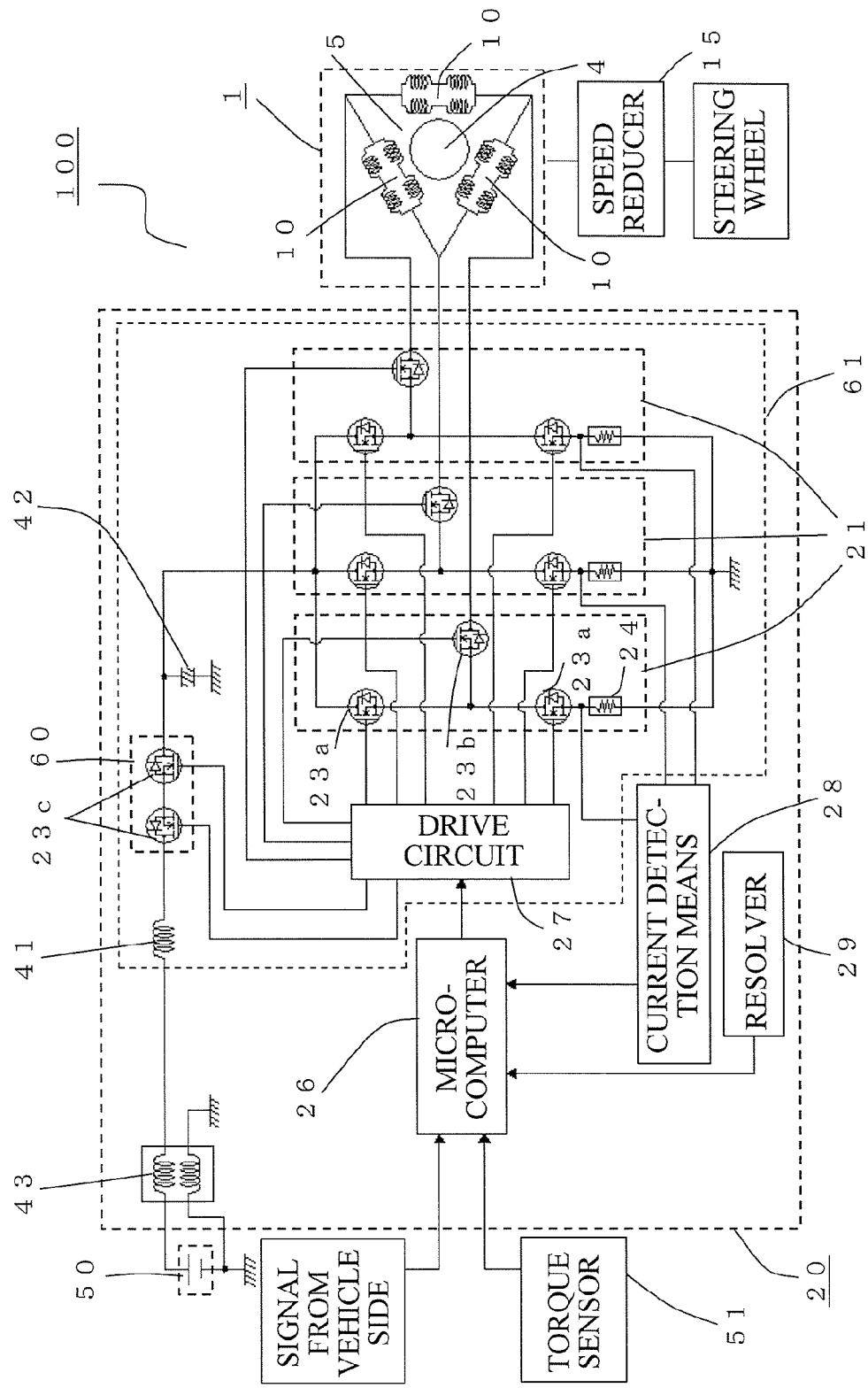
FIG. 2 is a circuit diagram illustrating the electric driving device according to the first embodiment of the present invention.

FIG. 1 is a sectional view illustrating an electric driving device 100 according to a first embodiment of the present invention. Further, FIG. 2 is a circuit diagram illustrating the electric driving device 100 according to the first embodiment of the present invention. The electric driving device 100 according to the first embodiment of the present invention is an electric driving device to be used in an electric power steering device, including an electric motor 1 for outputting assist torque to a steering of a vehicle, and a control device 20 for controlling drive of the electric motor 1.

The electric motor 1 according to the first embodiment is a three-phase brushless motor including a rotation shaft 2, a permanent magnet 3, a rotor 4, a stator 5, a motor frame 6, a coupling 7, and a bearing holder 14.

In this case, the rotor 4 is constructed so that the cylindrical permanent magnet 3 magnetized with, for example, ten poles is fixed to the rotation shaft 2. Further, the stator 5 is provided on the periphery of the rotor 4. Further, the motor frame 6 is made of iron or aluminum so as to fix the stator 5 to the motor frame 6.

Further, the coupling 7 is fixed to an end portion of the rotation shaft 2, and transmits torque of the electric motor 1 to a load. Moreover, the bearing holder 14 is held and fixed to the motor frame 6. Further, the rotation shaft 2 is held by a bearing that is held and fixed to the bearing holder 14.

The stator 5 includes, for example, twelve salient poles 8, which are opposed to an outer circumference of the permanent magnet 3, and armature windings 10, which are wound around the respective salient poles 8 through intermediation of insulators 9 mounted on the respective salient poles 8, and are connected to three phases, specifically, U, V, and W phases. The armature windings 10 are connected by, for example, delta connection, and end portions of the respective windings are connected, by joining means such as clamping and welding, to three terminals (intermediate members) 12U, 12V, and 12W, which are supported by a doughnut-like holder 11 made of a resin material having insulating property.

Note that, the number of poles of the permanent magnet 3 is set to ten, whereas the number of salient poles of the stator 5 is set to twelve. However, the electric driving device according to the present invention is not limited to this combination, and may employ other combinations of the numbers of poles and salient poles. Further, the armature windings 10 described above are connected by delta connection, but the present invention is not limited to this case, and the armature windings 10 may be connected by star connection.

The annular holder 11 has groove portions 11a formed into a recessed shape concentrically. The groove portions 11a are equal in number to the terminals 12. The circular-arc terminals 12 are supported in the groove portions 11a, respectively. Further, the terminals 12 are connected, by joining means such as clamping and welding, to motor terminals 13 extending from the electric motor 1 toward the control device 20 in parallel to an axis line of the rotation shaft 2, respectively. The motor terminals 13 are equal in number to the terminals 12. In this case, each motor terminal 13 is arranged on a radially outer side of the groove portion 11a, and thus an insulation distance is increased between the motor terminal 13 and the terminal 12 of another phase.

Further, a joining region between the motor terminal 13 and the terminal 12 is also arranged on the radially outer side, and thus a space necessary for connecting the motor terminal 13 and the terminal 12 by joining means such as welding can be secured. Moreover, the motor terminals 13 are arranged on the radially outer side, and hence the insulation distance is also secured between the motor terminals 13. Note that, the terminal 12 is made of a copper alloy having a lower thermal creep resistance characteristic than the motor terminal 13.

Note that, the creep refers to deformation that may be caused after an elapse of a certain period of time in a material that receives a given stress under a given temperature. Further, the material having a high thermal creep resistance characteristic refers to a material having a low degree of deterioration over time (deformation degree) when the material receives a given stress under heat.

Figure 3:
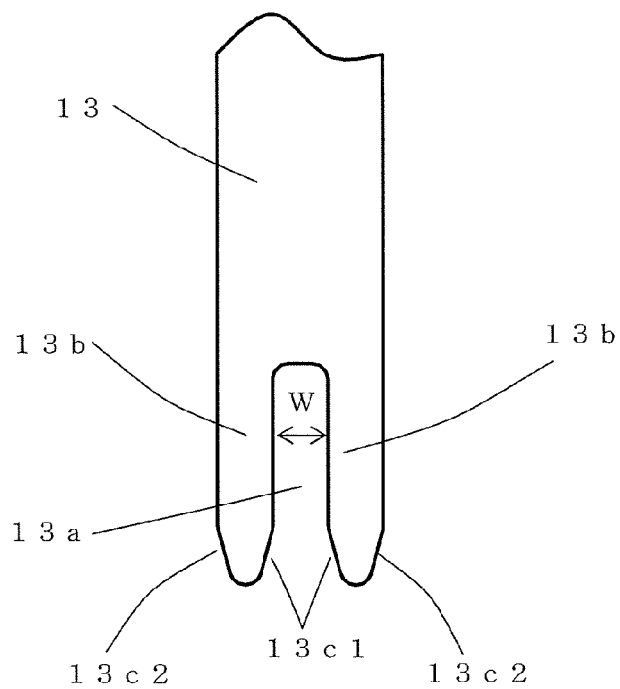
FIG. 3 is a main part front view illustrating a motor terminal of FIG. 1 according to the first embodiment of the present invention.

FIG. 3 is a main part front view illustrating the motor terminal 13 of FIG. 1 according to the first embodiment of the present invention. Now, the motor terminal 13 is described with reference to FIG. 3 and FIG. 1 referred to above.

As illustrated in FIG. 3, the motor terminal 13 has, for example, a pillar-like shape. Moreover, a slit 13a is formed at an end portion of the motor terminal 13 on the control device 20 side. Two arm portions 13b are formed by the slit 13a.

At distal end portions of the respective arm portions 13b on a side where the slit is formed (inner side of the motor terminal 13: see FIG. 3), tapers 13c1 are formed on both sides of the slit 13a so that a slit width W is gradually increased toward the distal end, that is, a width of each arm portion 13b is gradually decreased toward the distal end. Note that, in the first embodiment, tapers 13c2 are also formed at the distal end portions of the respective arm portions 13b on a side where the slit 13a is not formed (outer side of the motor terminal 13: see FIG. 3).

Further, the motor terminal 13 is formed by pressing a plate material made of a copper alloy, which is used for an on-vehicle connector or the like and is a special copper alloy having a higher thermal creep resistance characteristic, electric conductivity, and strength than a motor connection terminal 34 described later.

The motor terminal 13 is arranged so as to pass through a through hole 14a formed in the bearing holder 14, and extends toward the control device 20 side in parallel to an axis line direction of the rotation shaft 2.

Next, the control device 20 is described. The control device 20 for controlling the drive of the electric motor 1 includes power modules (semiconductor modules) 21 and a relay module (semiconductor module) 60 each having semiconductor switching elements 23 encapsulated with a mold resin, a control board 25 formed of an insulated printed-circuit board, passive elements (coil 41 and capacitor 42) connected to the semiconductor switching elements 23, a frame 30 formed of a plurality of conductive plates 31 by insert molding with an insulating resin, a heat sink 35 formed by aluminum die casting, a power connector 37 electrically connected to a battery 50 of the vehicle, a signal connector 38 for inputting and outputting signals to and from the vehicle side via external wiring, a torque sensor connector 39 for inputting and outputting signals to and from a torque sensor 51 via external wiring, a cover 40 having various connectors (power connector 37, signal connector 38, and torque sensor connector 39) formed thereon by integral molding, a housing 36 formed by aluminum die casting, fixed to the heat sink 35, and configured to hold the cover 40, insulating members 33 each fixed to the heat sink 35 and configured to hold the motor connection terminal 34, and a resolver stator 29b for a resolver 29, which is a rotation position sensor for detecting a rotation position of the rotor 4.

A resolver rotor 29a is held by the rotation shaft 2, and the resolver 29 is constructed by assembling the electric motor 1 and the control device 20. Note that, the description is herein given of the case where the resolver 29 is used as the rotation position sensor. However, the rotation position sensor according to the present invention is not limited to the resolver, and another magnetic detection element such as a magnetic resistance element or a Hall IC may be used as the rotation position sensor.

Figure 4:
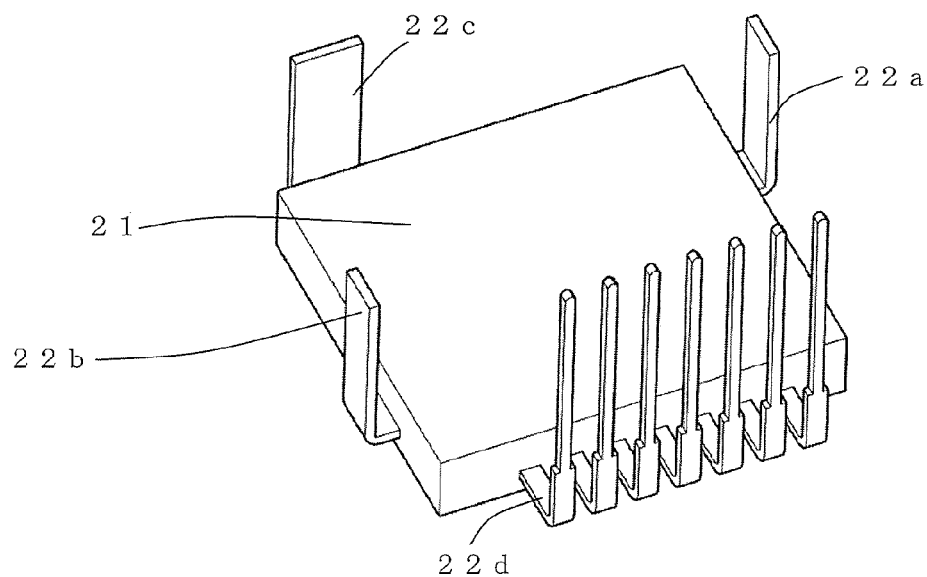
FIG. 4 is a perspective view illustrating a power module of FIG. 1 referred to above according to the first embodiment of the present invention.

FIG. 4 is a perspective view illustrating the power module 21 of FIG. 1 referred to above according to the first embodiment of the present invention. Now, the power module 21 is described next with reference to FIG. 1, FIG. 2, and FIG. 4.

The power module 21 is a transfer mold type module in which FETs 23a, an FET 23b, and a shunt resistor 24 are mounted by soldering on a lead frame 22 being made of copper or a copper alloy and having a wiring pattern formed thereon, and are encapsulated by integral molding with an insulating resin.

In this case, the FETs 23a form a three-phase bridge circuit for switching a motor current IM of the electric motor 1 depending on the magnitude and direction of the assist torque. Further, the FET 23b forms a motor relay serving as switching means for applying and interrupting the motor current IM to be supplied from the three-phase bridge circuit to the electric motor 1. Further, the shunt resistor 24 detects the motor current IM of the electric motor 1.

Further, as illustrated in FIG. 4, the power module 21 includes module power terminals 22a and 22b for supplying power to the built-in FETs 23a, a module-motor connection terminal 22c for supplying power from the power module 21 to the electric motor 1, and a module signal terminal 22d for controlling the FETs 23a and 23b. The module signal terminal 22d of the power module 21 is connected, by soldering, to a through hole 25b of the control board 25 described later.

Figure 11:
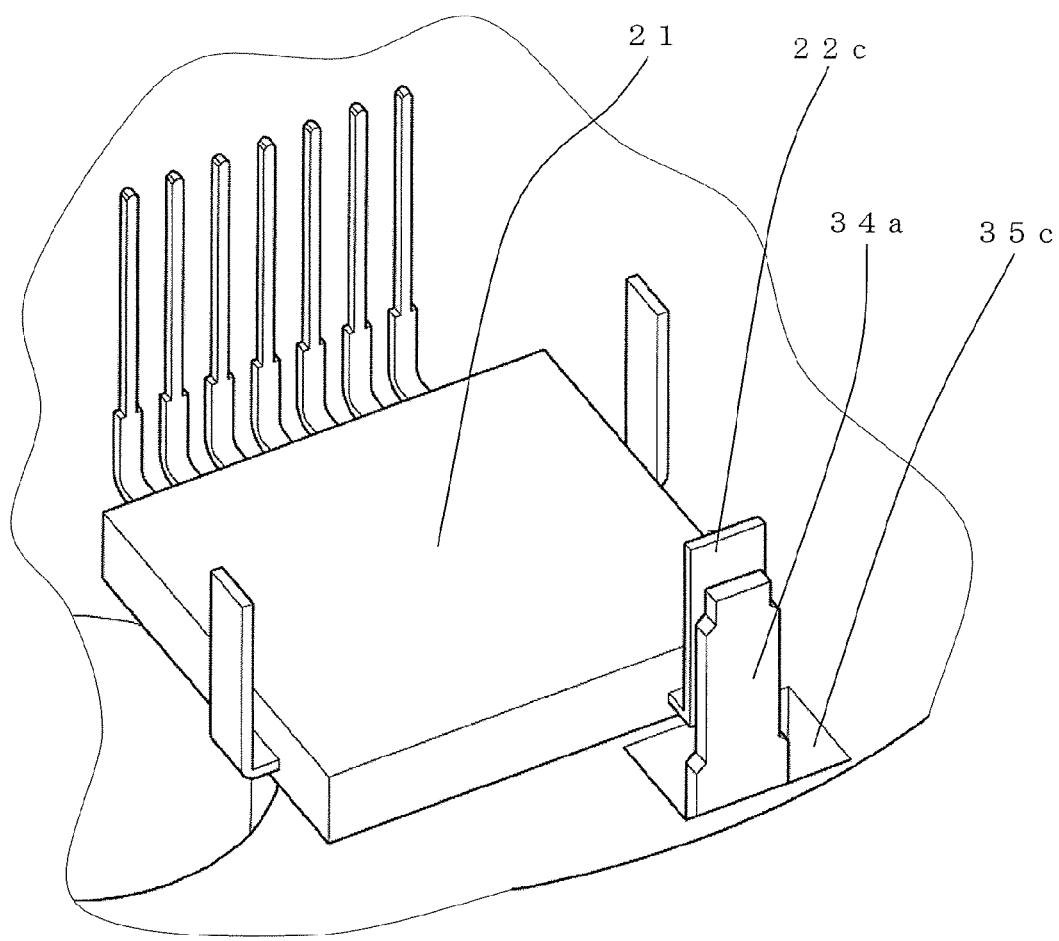
FIG. 11 is a perspective view as seen from an opposite side to the electric motor side, for illustrating the state immediately before the insulating member is press-fitted and fixed to the heat sink according to the first embodiment of the present invention.

Further, the module-motor connection terminal 22c of the power module 21 is connected, by welding, to a connection portion 34a of the motor connection terminal 34 described later (see FIG. 1 referred to above and FIG. 11 referred to later). Moreover, the module power terminals 22a and 22b are joined, by welding, to the conductive plates 31 of the frame 30 described later, respectively.

In the relay module 60, FETs 23c serving as switching means for applying and interrupting a power supply current IB from the battery 50 are mounted on the lead frame 22 by soldering. Further, similarly to the power module 21, the relay module 60 is a transfer mold type module in which the FETs 23c are encapsulated by integral molding with an insulating resin.

The electric motor 1 of the electric driving device according to the first embodiment is the three-phase brushless motor. Further, as understood from FIG. 1 and FIG. 2, the control device 20 includes three power modules 21 and one relay module 60, that is, a total of four semiconductor modules. Further, the four semiconductor modules are arranged at a pitch of substantially 90° in a circumferential direction of the control device 20.

The control board 25 is formed of a multi-layer (for example, four-layer or six-layer) glass epoxy substrate. The control board 25 has a through hole 25a into which the module signal terminal 22d is inserted. The module signal terminal 22d is soldered into the through hole 25a, and is therefore electrically connected to a wiring pattern of the control board 25.

Further, a microcomputer 26, a drive circuit 27, and current detection means 28 are mounted on the control board 25 by soldering. In this case, the microcomputer 26 computes the assist torque based on a steering torque signal from the torque sensor 51, and also computes a current corresponding to the assist torque by feeding back the motor current IM and the rotation position of the rotor of the electric motor 1, which is detected by the resolver 29.

Further, the drive circuit 27 outputs a drive signal for driving the FETs 23a in response to a command from the microcomputer 26. Moreover, the current detection means 28 is connected to one end of each shunt resistor 24, and detects the motor current IM flowing in the electric motor 1.

Note that, although the illustration is omitted, the microcomputer 26 has a known self-diagnosis function in addition to an AD converter, a PWM timer circuit, and the like. Further, with this self-diagnosis function, the microcomputer 26 always performs self-diagnosis on whether or not the system is operating normally. When any abnormality occurs, the microcomputer 26 interrupts the motor current IM.

Further, a drive section 61 for driving the electric motor 1 includes the semiconductor switching elements 23 (FETs 23a), the passive elements (coil 41 and capacitor 42), the drive circuit 27, and peripheral circuit elements. In this case, the semiconductor switching elements 23 (FETs 23a) switch the current of the electric motor 1. Further, the passive elements (coil 41 and capacitor 42) are electrically connected to the switching elements 23. Moreover, the drive circuit 27 outputs the drive signal for driving the FETs 23a.

Further, among the passive elements, the coil 41 is configured to eliminate electromagnetic noise to be generated during a switching operation of the semiconductor switching elements 23. The capacitor 42 is configured to absorb ripple components of the motor current IM flowing in the electric motor 1.

When a rotation direction command and a current control amount are input from the microcomputer 26 to the drive circuit 27, the drive circuit 27 generates a PWM drive signal, and applies the PWM drive signal to the FETs 23a. Thus, the power supply current IB from the battery 50 flows in the electric motor 1 through the power connector 37, the coil 41, and the FETs 23a and 23b so that a desired amount of assist torque is output in a desired direction. Note that, the motor current IM contains the ripple components due to the switching operation during PWM drive of the FETs 23a, but is controlled to be smoothed by the capacitor 42.

The frame 30 is formed of the plurality of conductive plates 31 by insert molding with an insulating resin. The plurality of conductive plates 31 are electrically connected to the module power terminals 22a and 22b of the power module 21, the coil 41, the capacitor 42, and various connectors (power connector 37, signal connector 38, and torque sensor connector 39), respectively.

The conductive plates 31 are formed on a plane perpendicular to the rotation shaft 2. Ends on one side of the conductive plates 31 are bent into an L-shape so as to form connection portions exposed from the insulating resin. Those connection portions are connected, by joining means such as welding, to the module power terminals 22a and 22b, various connectors (power connector 37, signal connector 38, and torque sensor connector 39), the coil 41, and the capacitor 42, respectively.

Figure 5:
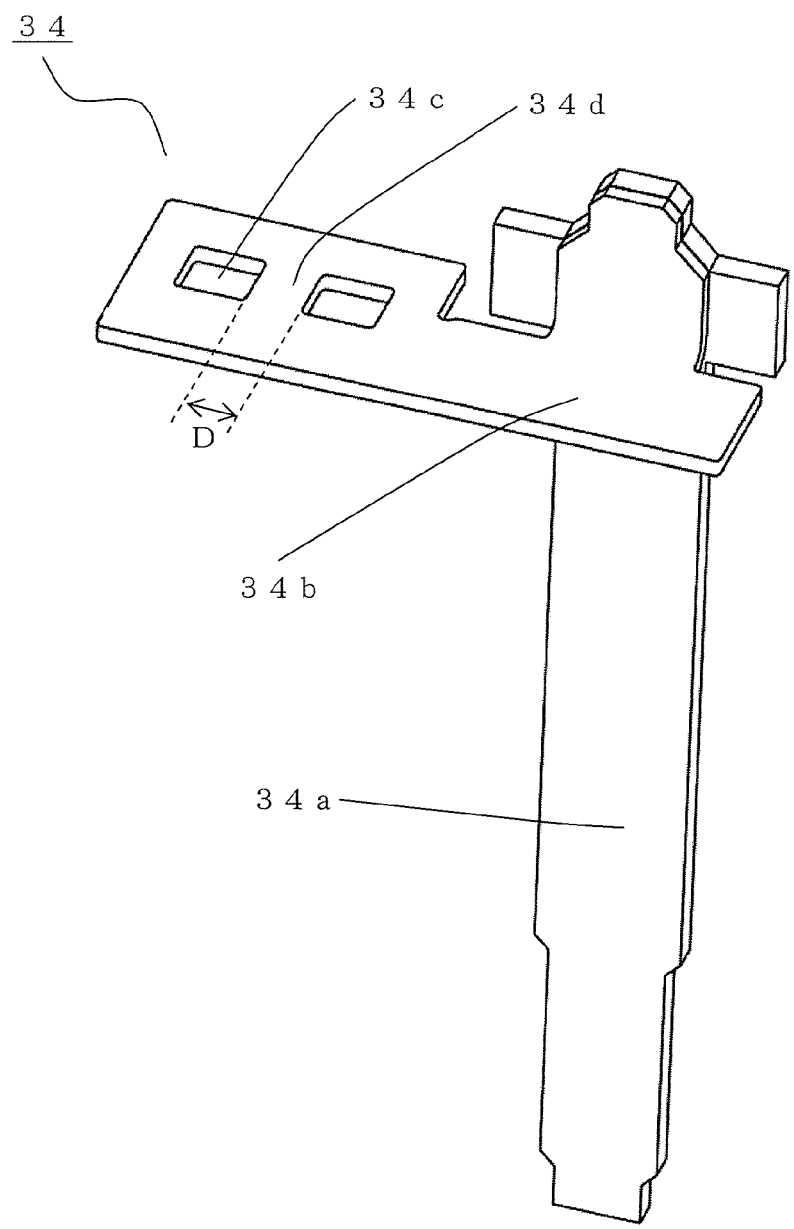
FIG. 5 is a perspective view illustrating a motor connection terminal according to the first embodiment of the present invention.

Now, the motor connection terminal 34 is described with reference to FIG. 5. FIG. 5 is a perspective view illustrating the motor connection terminal 34 according to the first embodiment of the present invention. The motor connection terminal 34 includes the connection portion 34a and a connection portion 34b. In this case, the connection portion 34a is a connection portion that is connected to the module-motor connection terminal 22c by joining means such as welding. Further, the connection portion 34b is a connection portion that is connected to the motor terminal 13. Further, the connection portion 34a and the connection portion 34b are joined to each other by means of welding or the like.

Moreover, the connection portion 34b has two insertion holes 34c into which the two arm portions 13b of the motor terminal 13 are inserted, respectively, and a terminal portion 34d (corresponding to a portion between the two insertion holes 34c) brought into pressure contact with the arm portions 13b of the motor terminal 13. A length D between the two insertion holes 34c is larger than the slit width W of the motor terminal 13 (see FIG. 3), that is, a relationship of D>W is satisfied.

Note that, the two arm portions 13b are inserted into the corresponding insertion holes 34c, respectively, so that the portion of the slit 13a (inner side of the motor terminal 13 at each arm portion 13b) pinches the terminal portion 34d. Thus, the length D between the insertion holes 34c corresponds to a width at the time of pinching the motor connection terminal 34 with the motor terminal 13.

Further, the motor connection terminal 34 is formed by pressing a copper plate into a predetermined shape (dimensions). Note that, in the first embodiment, there is exemplified the case where the motor connection terminal 34 is formed of two components, that is, the connection portions 34a and 34b, but the motor connection terminal 34 may be formed by pressing a single copper plate and bending the connection portion 34a into an L-shape.

Figure 6:
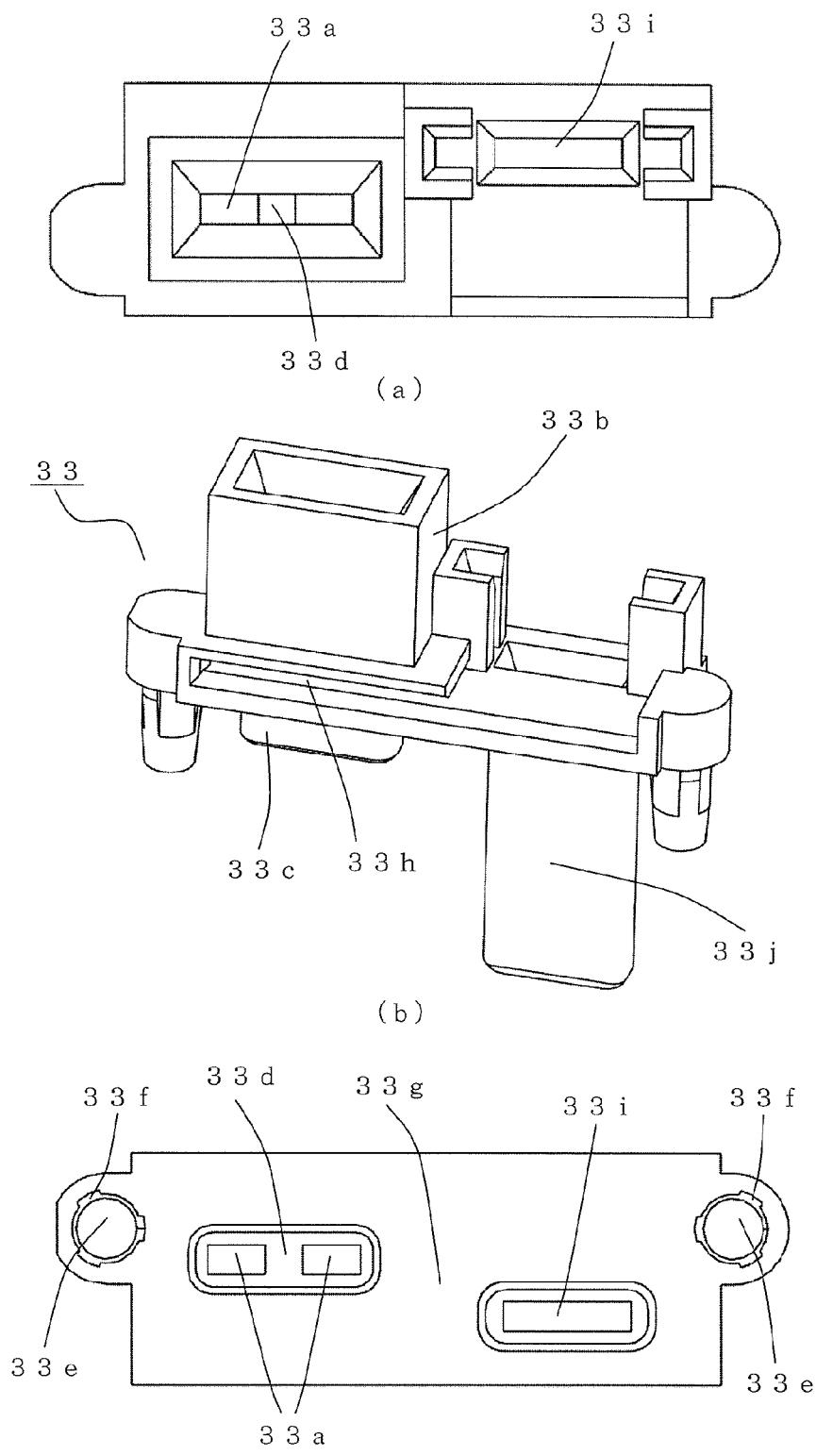
FIG. 6 are explanatory views each illustrating an insulating member according to the first embodiment of the present invention.

Next, the insulating member 33 is described with reference to FIGS. 6(a) to 6(c) and FIGS. 7(a) and 7(b). FIG. 6 are explanatory views each illustrating the insulating member 33 according to the first embodiment of the present invention. More specifically, FIG. 6(a) is a top view illustrating the insulating member 33 (front view illustrating the insulating member 33 as seen from the electric motor 1 side in a direction parallel to the rotation shaft), FIG. 6(b) is a perspective view, and FIG. 6(c) is a bottom view (front view illustrating the insulating member 33 as seen from the control device 20 side in the direction parallel to the rotation shaft).

Figure 7:
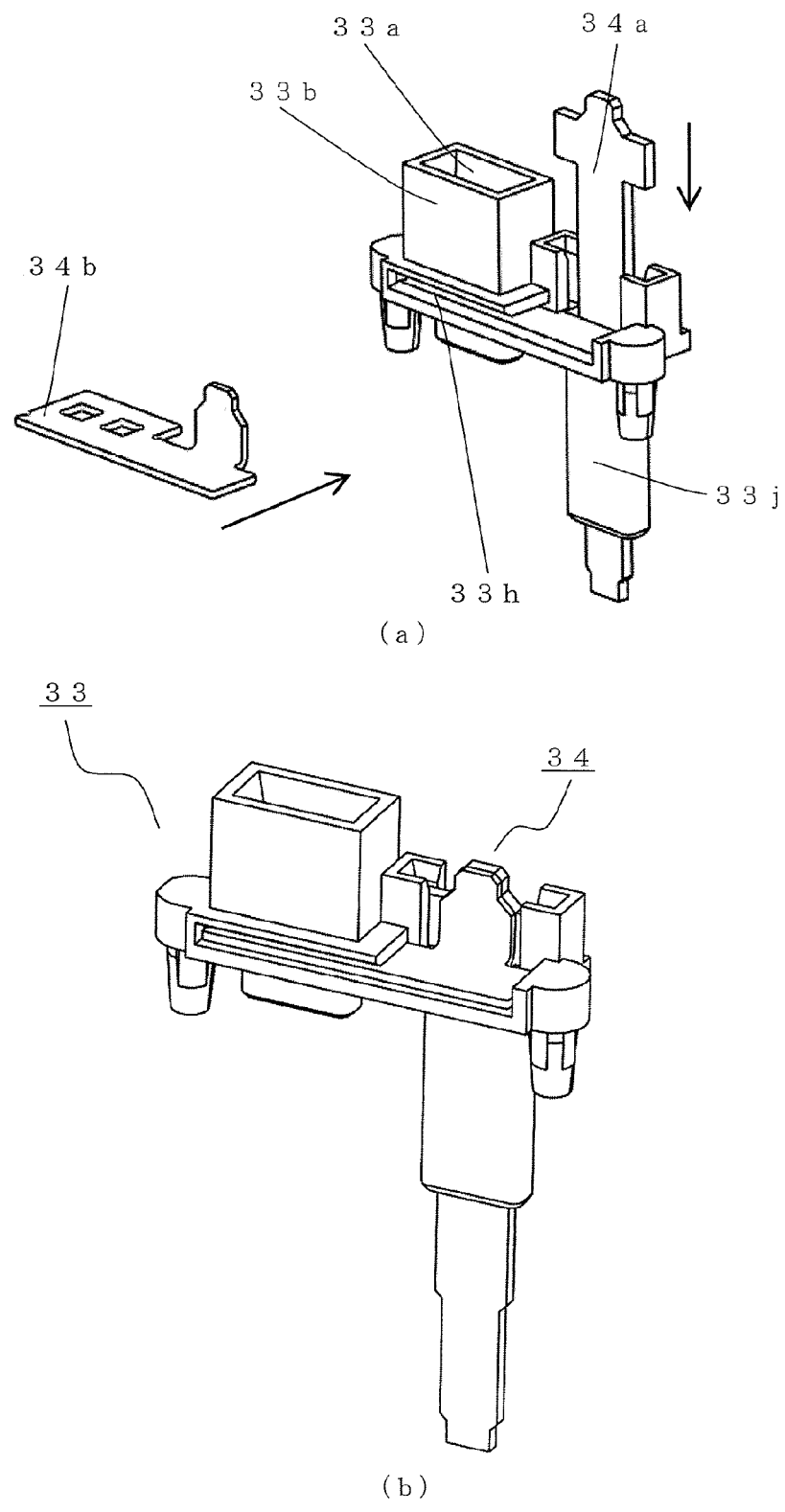
FIG. 7 are main part perspective views each illustrating a state in which the motor connection terminal is inserted into the insulating member prior to fixing the insulating member to a heat sink according to the first embodiment of the present invention.

Further, FIG. 7 are main part perspective views each illustrating a state in which the motor connection terminal 34 is inserted into the insulating member 33 prior to fixing the insulating member 33 to the heat sink 35 according to the first embodiment of the present invention. More specifically, FIG. 7(a) is a main part perspective view illustrating a state before the motor connection terminal 34 is inserted into the insulating member 33, and FIG. 7(b) is a main part perspective view illustrating a state after the motor connection terminal 34 is inserted into the insulating member 33.

The insulating member 33 is formed by molding with a thermoplastic resin such as PBT or PPS, to thereby insulate the motor connection terminal 34 from the metal component on its periphery.

Further, a slit 33h for inserting the motor connection terminal 34 therethrough is formed in a side surface portion of the insulating member 33. The entrance of the slit 33h has such a tapered shape that the cross section is gradually narrowed from an insertion port toward a deep side so as to facilitate the insertion of the motor connection terminal 34.

Further, an insertion hole 33a into which the motor terminal 13 is inserted is formed in the insulating member 33 at a position on the electric motor 1 side. Further, a guide portion 33b made of an insulating resin, for adjusting the position of the motor terminal 13 is formed on the insulating member 33 by integral molding. Note that, the guide portion 33b is formed substantially in parallel to the axis line direction of the rotation shaft 2.

The entrance portion of the insertion hole 33a has such a tapered shape that the axial cross section of the guide portion 33b is gradually narrowed from the electric motor 1 side (entrance) toward the opposite side to the electric motor 1 side (exit) in the axial direction. Therefore, when the motor terminal 13 passes through the insertion hole 33a, the position of the motor terminal 13 is adjusted, and the motor terminal 13 is guided to a given position on the motor connection terminal 34. Thus, the motor terminal 13 and the motor connection terminal 34 can reliably be brought into pressure contact with each other.

Further, in the insulating member 33 at a position on the opposite side to the electric motor 1 side (heat sink 35 side), a resin wall 33c made of an insulating resin, for surrounding the insertion hole 33a is formed substantially in parallel to the axis line direction of the rotation shaft 2. The resin wall 33c is formed so as to be elongated toward the opposite side to the electric motor 1 side (heat sink 35 side) with respect to the distal end of the motor terminal 13 under a state in which the motor terminal 13 is brought into pressure contact with the motor connection terminal 34.

The motor terminal 13 passes through the insertion hole 33a, and hence the distal end of the motor terminal 13 is located on an inner circumferential side of the resin wall 33c made of the insulating resin. Thus, the motor terminal 13 is structured so that the distal end portion of the motor terminal 13 is insulated from the metal component on its periphery.

Further, on an inner side of the resin wall 33c, a support member 33d made of a resin and thinner than the connection portion 34b of the motor connection terminal 34 is formed by integral molding. When the motor connection terminal 34 is press-fitted to the motor terminal 13, the motor connection terminal 34 receives a load in an insertion direction of the motor terminal 13, but the support member 33d is formed so that displacement of the motor connection terminal 34 in a load applying direction can be suppressed.

Further, two press-fitting pins 33e having tapers formed at the distal ends thereof are formed on the insulating member 33 by integral molding. Further, when the two press-fitting pins 33e are press-fitted to press-fitting holes 35d formed in the heat sink 35 described later, respectively, the insulating member 33 is press-fitted and fixed to the heat sink 35. At the root of each press-fitting pin 33e, three protrusions 33f larger in outer diameter than the press-fitting pin 33e are formed at every 120°. Thus, the force for holding the insulating member 33 is increased.

Note that, in the first embodiment, the number of the press-fitting pins 33e is set to two, but the number of the press-fitting pins 33e is not limited thereto. Further, a flange portion 33g is formed on the insulating member 33 so as to be pressed against the surface of the heat sink 35, which is perpendicular to the rotation shaft 2, when the insulating member 33 is fixed to the heat sink 35.

Moreover, an insertion hole 33i into which the connection portion 34a of the motor connection terminal 34 is inserted is formed in the insulating member 33 at a position on the opposite side to the electric motor 1 side (heat sink 35 side). Moreover, a resin wall 33j made of an insulating resin, for surrounding the insertion hole 33i is formed substantially in parallel to the axis line direction of the rotation shaft 2. Note that, in the first embodiment, the insertion hole 33i and the resin wall 33j are formed in the insulating member 33 by integral molding, but there is no problem even when the insertion hole 33i and the resin wall 33j are formed independently as separate components.

Figure 8:
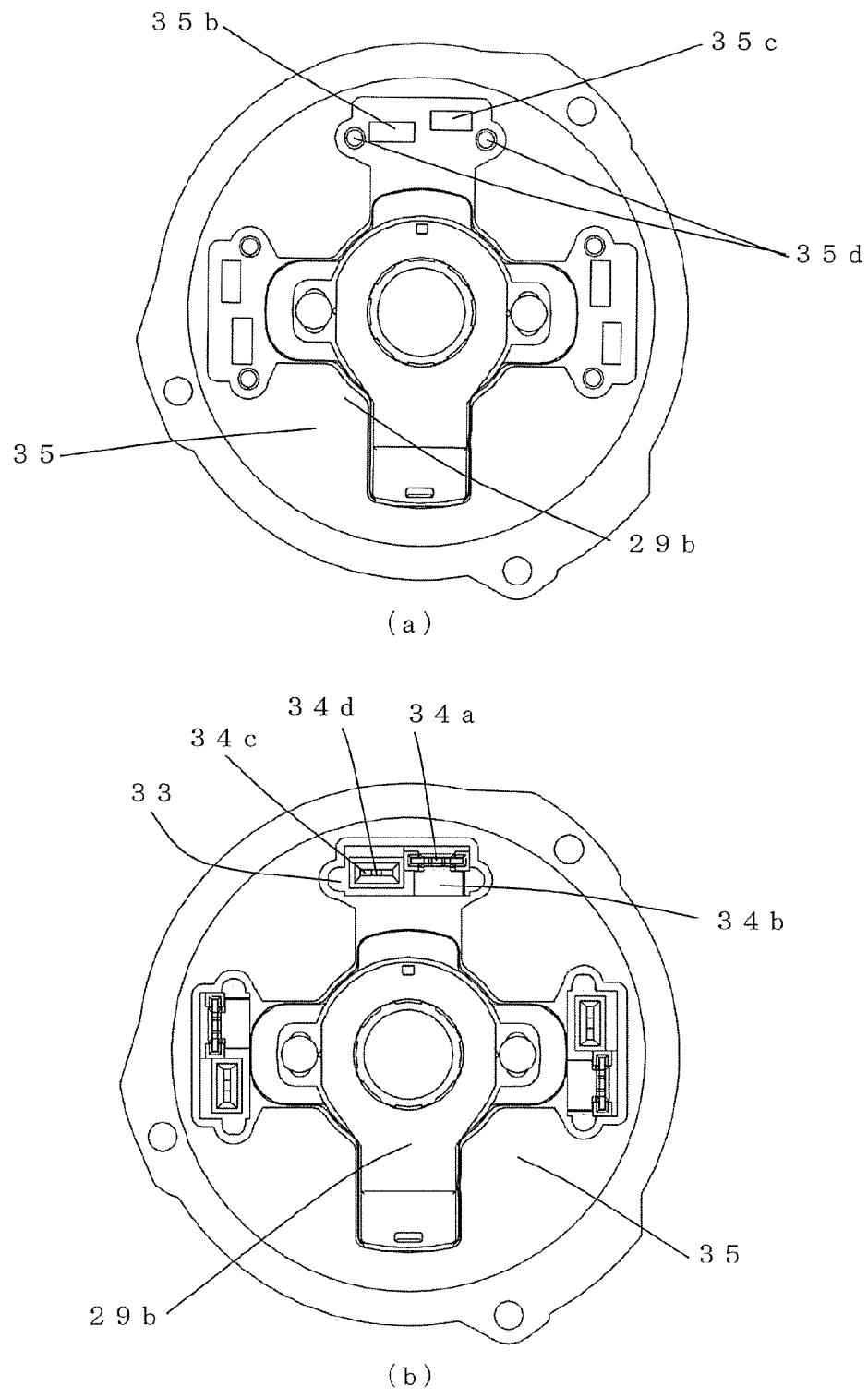
FIG. 8 are front views each illustrating the heat sink before and after the insulating member is fixed to the heat sink according to the first embodiment of the present invention.

Next, the heat sink 35 is described with reference to FIG. 1 referred to above and FIGS. 8(a) and 8(b). FIG. 8 are front views each illustrating the heat sink 35 before and after the insulating member 33 is fixed to the heat sink 35 according to the first embodiment of the present invention. More specifically, FIG. 8(a) is a front view as seen from the electric motor 1 side, for illustrating the heat sink 35 before the insulating member 33 is press-fitted and fixed, and FIG.

8(b) is a front view as seen from the electric motor 1 side, for illustrating the heat sink 35 after the insulating member 33 is press-fitted and fixed.

The heat sink 35 is arranged on the electric motor 1 side with respect to the frame 30. In the heat sink 35 at a position on the opposite side to the electric motor 1 side, the power modules 21 are fixed in close contact with the heat sink 35 through intermediation of a ceramic plate (not shown) having both heat conductivity and insulating property and being made of, for example, alumina, silicon nitride, or aluminum nitride. Grease or an adhesive having heat conductivity is applied to the surfaces of the ceramic plate, which are brought into contact with the power modules 21 and the heat sink 35.

Further, on the surface of the heat sink 35, to which the power modules 21 are fixed, the frame 30 is fixed with screws. The coil 41 and the capacitor 42 arranged on the frame 30 are inserted into a recessed portion 35a formed in the heat sink 35. Grease or an adhesive having heat conductivity is filled in gaps between the recessed portion 35a formed in the heat sink 35 and the coil 41 and between the recessed portion 35a and the capacitor 42.

In the heat sink 35 at a position on the electric motor 1 side, the resolver stator 29b of the resolver 29 corresponding to the rotation position sensor for detecting the rotation position of the rotor 4 is fixed with screws. Further, on the periphery of the resolver stator 29b, the insulating members 33 each holding the motor connection terminal 34 are press-fitted and fixed on an extension line of the motor terminal 13. In a region in which each insulating member 33 is press-fitted, a single recess 35b for receiving the resin wall 33c formed on the insulating member 33 and a single through hole 35c through which the connection portion 34a formed on the motor connection terminal 34 passes are formed for each single insulating member 33.

Further, the two press-fitting holes 35d to which the press-fitting pins 33e formed on the insulating member 33 are press-fitted, respectively, are formed for each single insulating member 33. The entrance portion of each press-fitting hole 35d has such a tapered shape that the cross section is gradually narrowed from the entrance toward a deep side so as to facilitate the insertion of the press-fitting pin 33e.

The heat sink 35 is arranged on the axis line of the rotation shaft 2. Further, the motor frame 6 forming the electric motor 1 and the heat sink 35 forming the control device 20 are fastened to each other with screws so that the electric motor 1 and the control device 20 are coupled to each other.

Note that, in the first embodiment, the number of the insulating members 33 press-fitted and fixed to the heat sink 35 is set to three (see FIG. 8), but the number of the insulating members 33 is not limited thereto. There is no problem as long as the number of the insulating members 33 is equal to or more than the number of phases of the electric motor 1 (in the first embodiment, three). Further, the number of the press-fitting holes is not limited to two.

The housing 36 is arranged on the axis line of the rotation shaft 2, and is fastened to the heat sink 35 forming the control device 20 with screws. The housing 36 covers the power modules 21, the control board 25, and the frame 30 together with the heat sink 35. Further, the cover 40 having various connectors (power connector 37, signal connector 38, and torque sensor connector 39) formed thereon by integral molding is fixed to the housing 36 with an adhesive.

Note that, a liquid packing is applied between the housing 36 and the heat sink 35. The housing 36 is held in contact with an arbitrary IC component mounted on the control board 25 (for example, microcomputer 26) through intermediation of a heat-conductive resin, grease, or an adhesive, to thereby effectively release heat generated from the IC component.

The cover 40 is constructed so that the power connector 37 electrically connected to the battery 50 of the vehicle, the signal connector 38 for inputting and outputting signals to and from the vehicle side via the external wiring, and the torque sensor connector 39 for inputting and outputting signals to and from the torque sensor 51 via the external wiring are formed by integral molding with a resin. Further, the cover 40 holds terminals made of conductive copper and electrically connected to various connectors.

An accommodating portion 40a, which accommodates a common mode coil 43 for eliminating conductive noise generated between a power supply line and a GND, is formed in the cover 40. Further, the common mode coil 43 is held and fixed to the cover 40 by means of, for example, bonding.

Figure 9:
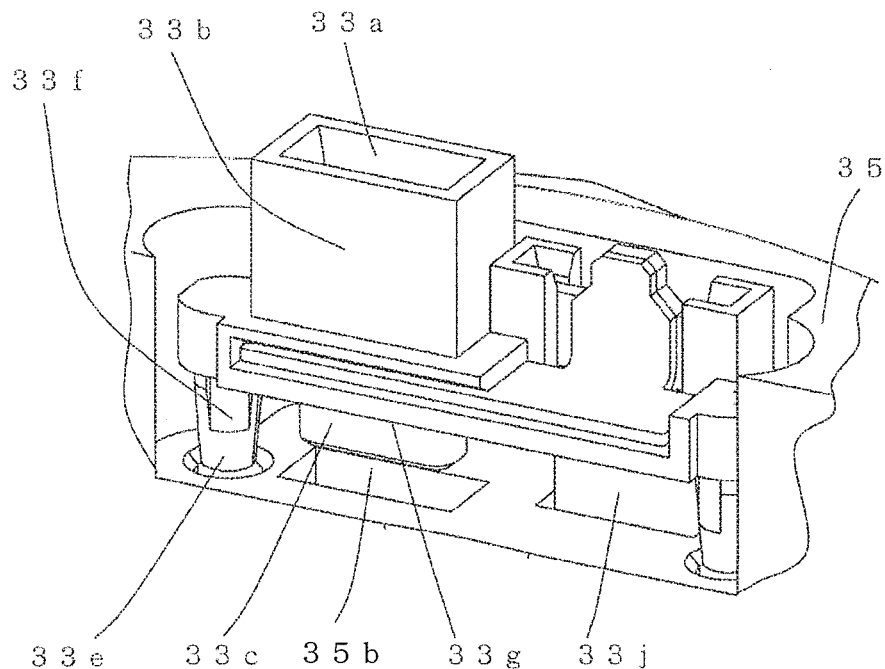
FIG. 9 is a perspective view as seen from an electric motor side, for illustrating a state immediately before the insulating member is press-fitted and fixed to the heat sink according to the first embodiment of the present invention.

Next, the fixing between the insulating member 33 and the heat sink 35 is described with reference to FIG. 7 and FIG. 8 referred to above, and to FIG. 9 to FIG. 11 referred to newly. FIG. 9 is a perspective view as seen from the electric motor 1 side, for illustrating a state immediately before the insulating member 33 is press-fitted and fixed to the heat sink 35 according to the first embodiment of the present invention.

Figure 10:
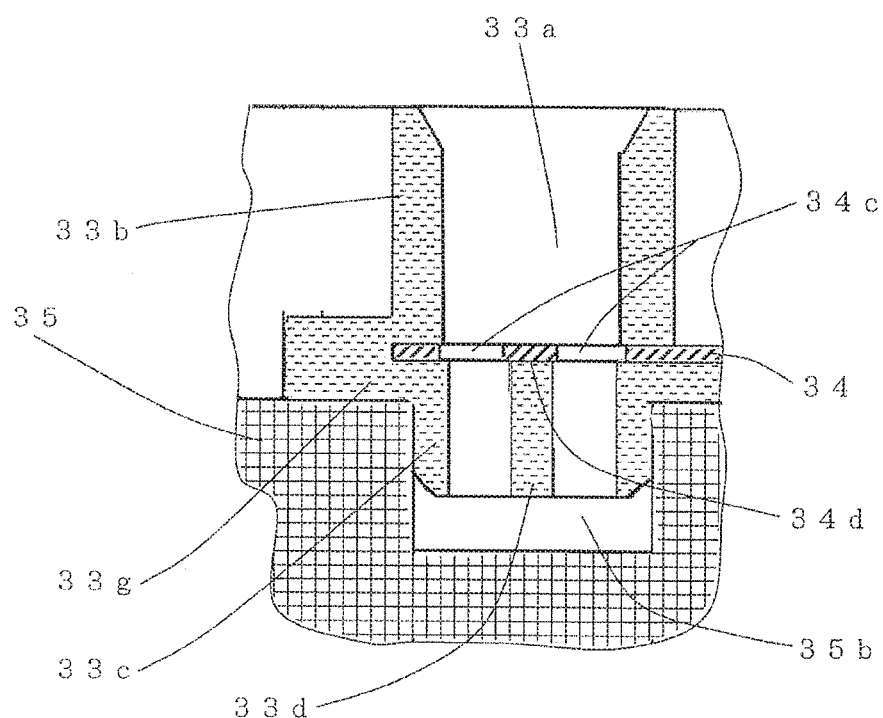
FIG. 10 is a sectional view illustrating a recess formed in the heat sink, which is cut along a cross section perpendicular to a rotation shaft under a state in which the insulating member is press-fitted and fixed to the heat sink according to the first embodiment of the present invention.

FIG. 10 is a sectional view illustrating the recess 35b formed in the heat sink 35, which is cut along a cross section perpendicular to the rotation shaft 2 under a state in which the insulating member 33 is press-fitted and fixed to the heat sink 35 according to the first embodiment of the present invention. Moreover, FIG. 11 is a perspective view as seen from the opposite side to the electric motor 1 side, for illustrating the state immediately before the insulating member 33 is press-fitted and fixed to the heat sink 35 according to the first embodiment of the present invention.

The two press-fitting pins 33e having the tapers formed at the distal ends thereof are formed on the insulating member 33 by integral molding. At the root of each press-fitting pin, the three protrusions 33f larger in outer diameter than the press-fitting pin 33e are formed at every 120°. The two press-fitting holes 35d to which the press-fitting pins 33e are press-fitted, respectively, are formed in the heat sink 35. Thus, when the insulating member 33 is assembled to the heat sink 35, the press-fitting pins 33e are press-fitted to the press-fitting holes 35d, respectively. As a result, the insulating member 33 is press-fitted and fixed to the heat sink 35.

In this case, when the press-fitting pins 33e are formed by molding, the resin is contracted and warped, and hence the accuracy of the pins is deteriorated. However, the protrusions 33f are formed at the pitch of 120°, and thus the press-fitting pins 33e can reliably be brought into contact with the press-fitting holes 35d, respectively. Thus, the insulating member 33 can reliably be held by the heat sink 35.

When the insulating member 33 is press-fitted to the heat sink 35, at the same time, the resin wall 33c formed on the insulating member 33 is received in the recess 35b formed in the heat sink 35. When this state is seen in a cross section parallel to the rotation shaft 2, as illustrated in FIG. 10, there is observed a two-layer structure in which the resin wall 33c is positioned on an inner side and the heat sink 35 is positioned on an outer side. Further, the flange portion 33g is formed on the insulating member 33. When the insulating member 33 is press-fitted to the heat sink 35, the flange portion 33g is pressed against the heat sink 35, and closes the recess 35b of the heat sink 35.

When the insulating member 33 is press-fitted to the heat sink 35, the connection portion 34a of the motor connection terminal 34 and the resin wall 33j are inserted into the through hole 35c formed in the heat sink 35. The distal end of the connection portion 34a at a position on the opposite side to the electric motor side passes through the through hole 35c, and is arranged so as to be opposed to the module-motor connection terminal 22c of the power module 21 mounted on the heat sink 35. After that, the module-motor connection terminal 22c and the connection portion 34a are electrically connected to each other by means of welding or the like.

The resin wall 33j insulates the connection portion 34a from the metal component on its periphery, and closes the through hole 35c. Thus, metal chippings and resin pieces are prevented from moving from the electric motor 1 toward the control device 20 side, or from the control device 20 toward the electric motor 1 side.

In the structure of the first embodiment, the press-fitting pins 33e are formed on the insulating member 33 so that the insulating member 33 is press-fitted and fixed to the heat sink 35. Alternatively, for example, such a structure may be employed that a protrusion is formed on the resin wall 33c of the insulating member 33 and press-fitted to the recess 35b of the heat sink 35. Further, the insulating member 33 may be fixed to the heat sink 35 by bonding with an adhesive instead of using the press-fitting pins 33e. Note that, there is no problem even when the order of inserting the motor connection terminal 34 into the insulating member 33 is set before or after the insulating member 33 is fixed to the heat sink 35.

Figure 12:
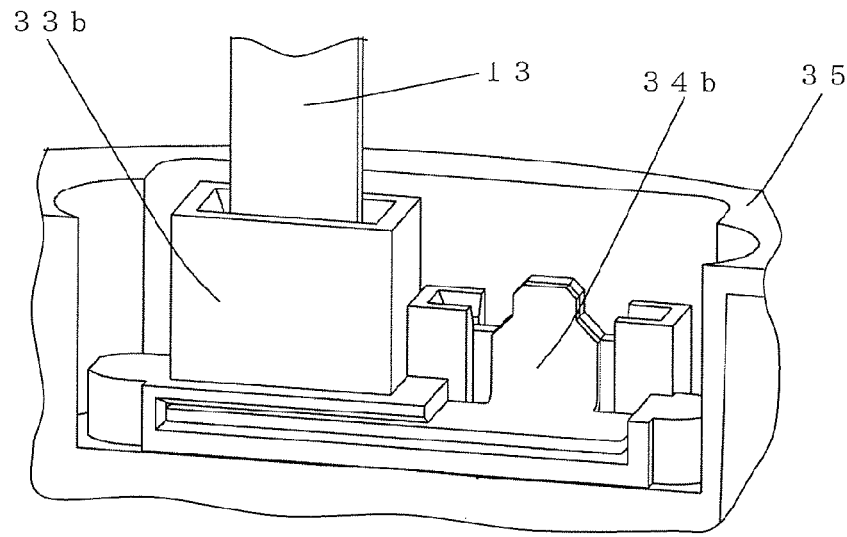
FIG. 12 are a main part perspective view and a sectional view each illustrating a state in which the motor terminal is fixed in pressure contact with the motor connection terminal according to the first embodiment of the present invention.
Figure 12:
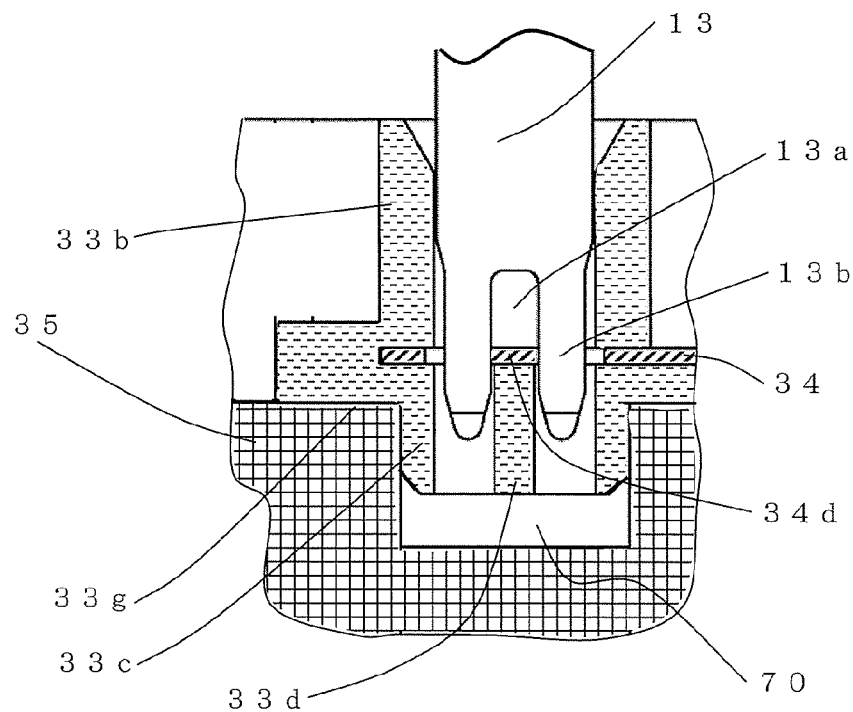

Next, the connection between the motor terminal 13 and the motor connection terminal 34 is described with reference to FIG. 1 referred to above and FIGS. 12(a) and 12(b) referred to newly. FIG. 12 are a main part perspective view and a sectional view each illustrating a state in which the motor terminal 13 is fixed in pressure contact with the motor connection terminal 34 according to the first embodiment of the present invention. More specifically, FIG. 12(a) is a perspective view illustrating a state in which the motor terminal 13 passes through the guide portion 33b and is press-fitted to the motor connection terminal 34, and FIG. 12(b) is a sectional view illustrating the state of FIG. 12(a), which is cut along a cross section parallel to the rotation shaft 2.

The motor terminal 13 provided on the electric motor 1 extends from the electric motor 1 toward the control device 20 in parallel to the axis line direction of the rotation shaft 2. Further, the arm portions 13b and the slit 13a are formed at the end portion of the motor terminal 13 on the control device 20 side.

The insulating member 33 having the motor connection terminal 34 held and fixed thereto is press-fitted and fixed to the heat sink 35. The guide portion 33b formed on the insulating member 33 extends toward the electric motor 1. Further, the heat sink 35 faces the electric motor 1 in the axis line direction of the rotation shaft 2, and at a timing to assemble the electric motor 1 and the heat sink 35 to each other, the motor terminal 13 is inserted into the insertion hole 33a of the guide portion 33b.

In the insertion hole 33a at a position on the opposite side to the electric motor 1 side, the motor connection terminal 34 is positioned and fixed. Further, the arm portions 13b of the motor terminal 13 are inserted into the insertion holes 34c of the motor connection terminal 34, respectively.

Moreover, the connection portion 34d of the motor connection terminal 34 is pinched by the slit 13a formed in the motor terminal 13, and thus the motor terminal 13 is press-fitted to the motor connection terminal 34. As a result, both the terminals are electrically connected to each other in a pressure contact state. Therefore, at the timing to assemble the electric motor 1 and the heat sink 35 to each other, the motor terminal 13 is fixed in a state of being press-fitted to the motor connection terminal 34.

In this case, the motor connection terminal 34 is pressurized in the insertion direction of the motor terminal 13, but the support member 33d formed on the insulating member 33 supports the terminal portion 34d of the motor connection terminal 34, and hence deformation of the motor connection terminal 34 is suppressed. Further, the insulating member 33 is similarly pressurized in the insertion direction of the motor terminal 13, but the insulating member 33 is pressed against the heat sink 35 through intermediation of the flange portion 33g, and hence deformation of the insulating member 33 is also suppressed.

Further, under a state in which the insulating member 33 is pressurized by the motor terminal 13, the insulating member 33 is brought into contact with the heat sink 35 through intermediation of the flange portion 33g, and hence heat resistance is reduced between the insulating member 33 and the heat sink 35. Thus, when the electric driving device is in operation, the heat generated from the motor connection terminal 34 can efficiently be transferred to the heat sink 35.

Further, the pressure contact portion between the motor terminal 13 and the motor connection terminal 34 is received in a closed space 70 surrounded on its periphery by the insulating member 33, the heat sink 35, the motor connection terminal 34, and the motor terminal 13.

When the motor connection terminal 34 is press-fitted to the motor terminal 13, the contact portion between both the components may be chipped to generate metal chippings. When the chippings connect conductive portions during the operation of the electric driving device, short-circuit failure may be induced. In the structure of the first embodiment, however, the generated metal chippings can be confined in the closed space 70. Therefore, the short-circuit failure can be suppressed.

Note that, the closed space 70 is closed by the flange portion 33g forming the insulating member 33, and has a double structure in which the resin wall 33c and the recess 35b of the heat sink 35 are superimposed in a radial direction. Therefore, a path through which the metal chippings confined in the closed space 70 flow out of the closed space 70 becomes more complicated, and thus the degree of sealability of the closed space 70 is further increased.

Further, the motor terminal 13 is inserted into an inner side of the resin wall 33c, and is therefore insulated from the metal component on its periphery (heat sink 35).

Note that, the connection between the module-motor connection terminal 22c of the power module (semiconductor module) 21 and the connection portion 34a may be carried out by means of welding or the like in advance before the electric motor 1 and the heat sink 35 are assembled to each other, or may be carried out after the electric motor 1 and the heat sink 35 are assembled to each other.

To sum up the details described above, in the electric driving device 100 according to the first embodiment of the present invention, the control device 20 is arranged on the axis line of the rotation shaft 2 of the electric motor 1. Further, the electric motor 1 includes the motor terminal 13 extending toward the control device 20 side. Further, the slit 13a is formed at the end portion of the motor terminal 13 on the control device 20 side (end portion on the other side). Moreover, the control device 20 includes the motor connection terminal 34 provided on the extension line of the motor terminal 13 and electrically connected to the motor terminal 13.

Further, the motor connection terminal 34 is pinched by the slit 13a, and thus the motor terminal 13 is press-fitted to the motor connection terminal 34. As a result, both the terminals are electrically connected to each other. Thus, there is no need to newly use the components such as screws for the connection between both the terminals. As a result, the number of components is reduced, and the screw fastening process is also unnecessary. Accordingly, the number of assembling steps can be reduced and the cost can also be reduced.

Further, as compared to the case where the space for arranging the screws and the insertion space for the screw fastening are secured separately for the screw fastening, those spaces are also unnecessary. As a result, the electric driving device can be downsized.

Further, the screws for connecting the terminals to each other are unnecessary, and hence the cover for closing the insertion port for the screw fastening tool is also unnecessary. As a result, the number of components and the number of assembling steps are reduced, and the cost can also be reduced.

Further, the arm portions 13b of the motor terminal 13 are inserted into the insertion holes 34c of the motor connection terminal 34, respectively. In addition, the portion between the insertion holes 34c of the motor connection terminal 34 is pinched by the slit 13a. Thus, the motor terminal 13 is fixed in the state of being press-fitted to the motor connection terminal 34. As a result, as compared to the case where the terminal having a pin shape is inserted and press-fitted to the insertion hole, the press-fitting load (press-fitting force) at the time of press-fitting is distributed to the two arm portions 13b split by the slit 13a, and hence the press-fitting force to be applied to each single arm portion 13b is reduced. Accordingly, the degree of deterioration of the portion fixed in the state of being press-fitted (press-fitting and fixing portion) over time is reduced, and accordingly the electric driving device enhanced in reliability can be obtained.

Moreover, at the timing to assemble the electric motor 1 and the heat sink 35 to each other, the motor terminal 13 is fixed in the state of being press-fitted to the motor connection terminal 34, and thus the easiness of assembling of the electric driving device is enhanced.

Further, at least at the distal end portions of the slit 13a of the motor terminal 13, the tapers 13c1 are formed on both sides of the slit 13a so that the slit width is gradually increased toward the distal end. Further, when the motor connection terminal 34 is pinched by the slit 13a of the motor terminal 13, portions of the tapers 13c1 formed on the side where the slit 13a is formed (inner side of the motor terminal) serve to guide the motor terminal 13 to a region between the insertion holes 34c formed in the motor connection terminal 34, and thus the motor connection terminal 34 can smoothly be pinched. As a result, the easiness of assembling of the electric driving device is enhanced.

Besides, in the first embodiment, the tapers 13c2 are also formed at the end portions of the motor terminal 13 on the control device 20 side, specifically, on the side where the slit 13a is not formed (outer side of the motor terminal 13). Therefore, the tapers 13c2 serve to guide the motor terminal 13 into the insertion holes 34c formed in the motor connection terminal 34, and thus the motor connection terminal 34 can smoothly be inserted into the insertion holes 34c. As a result, the fluctuation of dimensions can be absorbed for the slit width W of the motor terminal 13 and the length D of the terminal portion 34d, and thus the easiness of assembling of the electric driving device is enhanced.

Further, the motor terminal 13 is made of a copper alloy having a higher thermal creep resistance characteristic than the motor connection terminal 34. Therefore, the degree of deterioration of the press-fitting and fixing portion over time is reduced, and thus the electric driving device enhanced in reliability can be obtained.

In the first embodiment, the motor terminal 13 is made of a copper alloy, which has a higher thermal creep resistance characteristic than the motor connection terminal 34 and is a special copper alloy having higher electric conductivity and strength. Accordingly, in addition to the low degree of deterioration of the press-fitting and fixing portion over time, the heat generation amount of the motor terminal 13 becomes smaller and the strength thereof becomes higher. As a result, the electric driving device further enhanced in reliability can be provided.

Further, the control device 20 according to the first embodiment of the present invention includes three power modules 21 and one relay module, that is, a total of four semiconductor modules. Further, those semiconductor modules are arranged at the pitch of substantially 90° with regular intervals in the circumferential direction of the control device 20, and the three motor terminals 13U, 13V, and 13W are also arranged at the pitch of substantially 90° with regular intervals corresponding to the three power modules 21.

In this manner, the three motor terminals 13 are arranged at the pitch of 90° with regular intervals, and thus the insulation distance can sufficiently be secured between the motor terminals 13. As a result, the reliability of the electric driving device is enhanced.

Moreover, the guide portion 33b along which the motor terminal 13 is inserted is formed on the insulating member 33. Therefore, when the motor terminal 13 is brought into pressure contact with the motor connection terminal 34, the guide portion 33b adjusts the position of the motor terminal 13 to a given position on the motor connection terminal 34. As a result, the motor terminal 13 can be brought into pressure contact with the motor connection terminal 34 in accordance with the guide of the guide portion 33b, and thus the easiness of assembling of the electric driving device is enhanced. Further, the guide portion 33b is formed on the insulating member 33 by integral molding. Thus, the positional accuracy of the guide portion 33b is enhanced, with the result that the easiness of assembling of the electric driving device is further enhanced and the reliability of the electric driving device is enhanced.

Moreover, in the first embodiment, the guide portion 33b is formed so as to cover the periphery of the motor terminal 13. As a result, the insulating property can be secured, and thus the reliability of the electric driving device is further enhanced.

Further, in the insulating member 33, the two press-fitting pins 33e having the tapered shapes at the distal ends thereof are formed by integral molding. The insulating member 33 is press-fitted and fixed to the heat sink 35. Therefore, when the insulating member 33 is held and fixed, there is no need to newly use the components such as screws. Thus, the number of components of the electric driving device is reduced, and the screw fastening process is also unnecessary. Accordingly, the number of assembling steps can be reduced. As a result, the cost of the electric driving device can also be reduced.

Further, the two press-fitting pins 33e are formed, and hence the misalignment of the fixing position of the insulating member 33 is suppressed, with the result that the easiness of assembling of the electric driving device is enhanced. Moreover, at the root of each press-fitting pin 33e, the three protrusions 33f larger in outer diameter than the press-fitting pin 33e are formed at every 120°.

The press-fitting pin 33e made of a resin may have an error in accuracy due to the warp, the contraction, and the like at the time of molding. However, the protrusions 33f are formed, and thus the press-fitting pin 33e can reliably be brought into contact with the side surface of the press-fitting hole 35d formed in the heat sink 35. As a result, the error in dimensions of the press-fitting pin 33e can be absorbed, and the insulating member 33 can reliably be held and fixed to the heat sink 35. Accordingly, the easiness of assembling of the electric driving device and the reliability thereof are further enhanced.

Further, the resin wall 33c and the flange portion 33g are formed on the insulating member 33. Further, when the insulating member 33 is press-fitted to the heat sink, the resin wall 33c is inserted into the recess 35b of the heat sink 35, whereas the flange portion 33g is pressed against the heat sink 35, and closes the entrance portion of the recess 35b.

In this state, when the motor terminal 13 is brought into pressure contact with the motor connection terminal 34, a part of the recess 35b serves as the closed space 70 surrounded by the heat sink 35, the insulating member 33, the motor connection terminal 34, and the motor terminal 13. As a result, the pressure contact portion between the motor connection terminal 34 and the motor terminal 13 is encapsulated by the closed space 70.

When the motor connection terminal 34 is press-fitted to the motor terminal 13, the contact portion between both the components may be chipped to generate metal chippings. In the structure of this embodiment, however, the generated chippings can be confined in the closed space 70. Therefore, the short-circuit failure that may be caused by the chippings is suppressed, with the result that the reliability of the electric driving device is further enhanced.

Further, in the structure of this embodiment, the closed space 70 has the double structure in which the resin wall 33c and the heat sink 35 are superimposed in the radial direction. Therefore, the path through which the metal chippings flow out of the closed space becomes more complicated, and thus the reliability of the electric driving device is further enhanced. Moreover, the resin wall 33c made of the insulating material is arranged on the inner side of the recess 35b. Therefore, the insulating property can be enhanced between the motor terminal 13 and the heat sink 35, and thus the reliability of the electric driving device is further enhanced.

Further, when the insulating member 33 is fixed to the heat sink 35, the flange portion 33g is pressed against the heat sink, with the result that the heat sink 35 supports the insulating member 33. Thus, when the motor terminal 13 is inserted into the motor connection terminal 34, the load that may be received by the insulating member 33 can be received by the heat sink 35. As a result, the deformation of the insulating member 33 and the damage thereto can be prevented, and accordingly the easiness of assembling of the electric driving device and the reliability thereof are enhanced.

Further, the support member 33d having a smaller width than the terminal portion 34d of the motor connection terminal 34 is formed on the insulating member 33. When the motor terminal 13 is inserted into the motor connection terminal 34, the support member 33d may receive, without hindering the insertion of the motor terminal 13, the load that may be received by the motor connection terminal 34. As a result, the deformation of the motor connection terminal 34 and the damage thereto can be prevented, and accordingly the easiness of assembling of the electric driving device and the reliability thereof are enhanced.

Further, under the state in which the insulating member 33 is pressurized by the motor terminal 13, the insulating member 33 is held by the heat sink 35 through intermediation of the flange portion 33g. Thus, the heat resistance is reduced between the insulating member 33 and the heat sink 35. When the electric driving device is in operation, the heat generated from the motor connection terminal 34 can efficiently be released to the heat sink, and thus the reliability of the electric driving device is enhanced. Moreover, the heat releasing performance is enhanced, and hence the electric driving device can be downsized.

Further, the motor connection terminal 34 is externally inserted to the slit 33h formed in the insulating member 33. Therefore, the motor connection terminal 34 is not completely restrained with respect to the insulating member 33, and has a degree of freedom. Thus, even when vibration of the electric driving device or linear expansion of the material due to temperature change occurs under the state in which the motor terminal 13 is press-fitted, the stress that may be generated in the press-fitting portion can be alleviated, and accordingly the reliability of the electric driving device is enhanced.

Further, the motor connection terminal 34 includes the connection portion 34a connected to the module-motor connection terminal 22c by joining means such as welding, and the connection portion 34b brought into pressure contact with the motor terminal 13. Further, those connection portions 34a and 34b are joined to each other by means of welding or the like. Thus, the motor connection terminal 34 is formed of two components. As a result, design requirements of the connection portions 34a and 34b (material, thickness, shape, presence or absence of plating, and the like) can arbitrarily be set depending on the specifications and structure of the electric driving device, and thus the degree of design freedom is enhanced.

Further, the insulating member 33 is arranged on the extension line of the motor terminal 13 under a state in which the motor connection terminal 34 is held. Moreover, the number of the insulating members 33 fixed to the heat sink 35 is at least equal to the number of phases of the electric motor 1 (in this embodiment, three). Thus, the insulation distance can be secured between the motor terminals 13 having different phases and between the motor connection terminals 34 having different phases, and accordingly the reliability of the electric driving device is enhanced.

Further, the motor connection terminal 34 is arranged on the extension line of the motor terminal 13. Therefore, the press-fitting of the motor terminal 13 is not received on the radially inner side in the vicinity of the rotation shaft 2 in a concentrated manner, but the press-fitting load can be received on the radially outer side in a distributed manner. As a result, the reliability of the electric driving device is enhanced.

Further, the passive elements, such as the coil 41 and the capacitor 42, and the semiconductor switching elements 23 forming the drive section 61 are heat generating components. Further, the coil 41 and the capacitor 42 are inserted into the recessed portion 35*a* formed in the heat sink 35. Moreover, the semiconductor modules (power modules 21 and relay module 60) each having the semiconductor switching elements 23 encapsulated with a mold resin are fixed in close contact through intermediation of the ceramic plate having heat conductivity.

As a result, the heat generated from the semiconductor modules is released by the heat sink 35, and thus the heat releasing performance of the electric driving device is enhanced. Therefore, the temperature rise at the time of heat generation from the heat generating components is suppressed, and accordingly the reliability of the electric driving device is enhanced.

Among the heat generating components, the coil 41 and the capacitor 42 are inserted into the recessed portion 35*a* formed in the heat sink 35. Thus, the heat generated from the coil 41 and the capacitor 42 is transferred and released to the heat sink 35 from the outer circumferential surfaces as well as the axial end surfaces on the heat sink 35 side. Accordingly, as compared to the case where the heat is transferred and released to the heat sink 35 from the axial end surfaces on the heat sink 35 side alone, the heat releasing performance of the electric driving device is enhanced.

Further, in the first embodiment, grease or an adhesive having heat conductivity is applied to the ceramic plate so that the heat resistance of bonding is reduced between the components. Moreover, grease or an adhesive having heat conductivity is filled in the gaps between the coil 41 and the recessed portion 35*a* of the heat sink 35 and between the capacitor 42 and the recessed portion 35*a*, and thus the heat releasing from the coil 41 and the capacitor 42 to the heat sink 35 is promoted. As a result, the heat releasing performance of the electric driving device is further enhanced.

Note that, the description is given on the assumption that the insulating member arranged between the heat sink 35 and the semiconductor modules (power modules 21 and relay module 60) is the ceramic plate. However, the insulating member is not limited to the ceramic plate, and may be an adhesive having a high heat conductivity material such as alumina mixed as filler, or a heat releasing and insulating sheet made of a material such as silicon.

Further, the electric driving device 100 is formed by assembling the electric motor 1 and the control device 20 to each other, and the motor terminal 13 is arranged inside the electric driving device 100. Accordingly, external foreign matters can be prevented from entering the portion of the motor terminal 13. Moreover, the pressure contact portion between the motor terminal 13 and the motor connection terminal 34 is positioned and fixed in the closed space 70 formed by the insulating member 33, the heat sink 35, the motor connection terminal 34, and the motor terminal 13. Therefore, for example, even when external foreign matters (such as dust and water droplets) enter the electric motor 1, the external foreign matters can be prevented from entering the pressure contact portion. As a result, the water resistance and the insulating property of the press-fitting and fixing portion can be secured.

Further, the liquid packings are applied between the housing 36 and the heat sink 35 and between the housing 36 and the electric motor 1. Therefore, the regions between the housing 36 and the heat sink 35 and between the housing 36 and the electric motor 1 can be sealed, and accordingly the water resistance of the electric driving device is enhanced.

Note that, in the first embodiment, the description is given on the assumption that the waterproof structure between the housing 36 and the heat sink 35 (electric motor 1) is the liquid packing. However, the waterproof structure is not limited thereto, and for example, an O-ring and a rubber packing may be employed instead.

Second Embodiment

Figure 13:
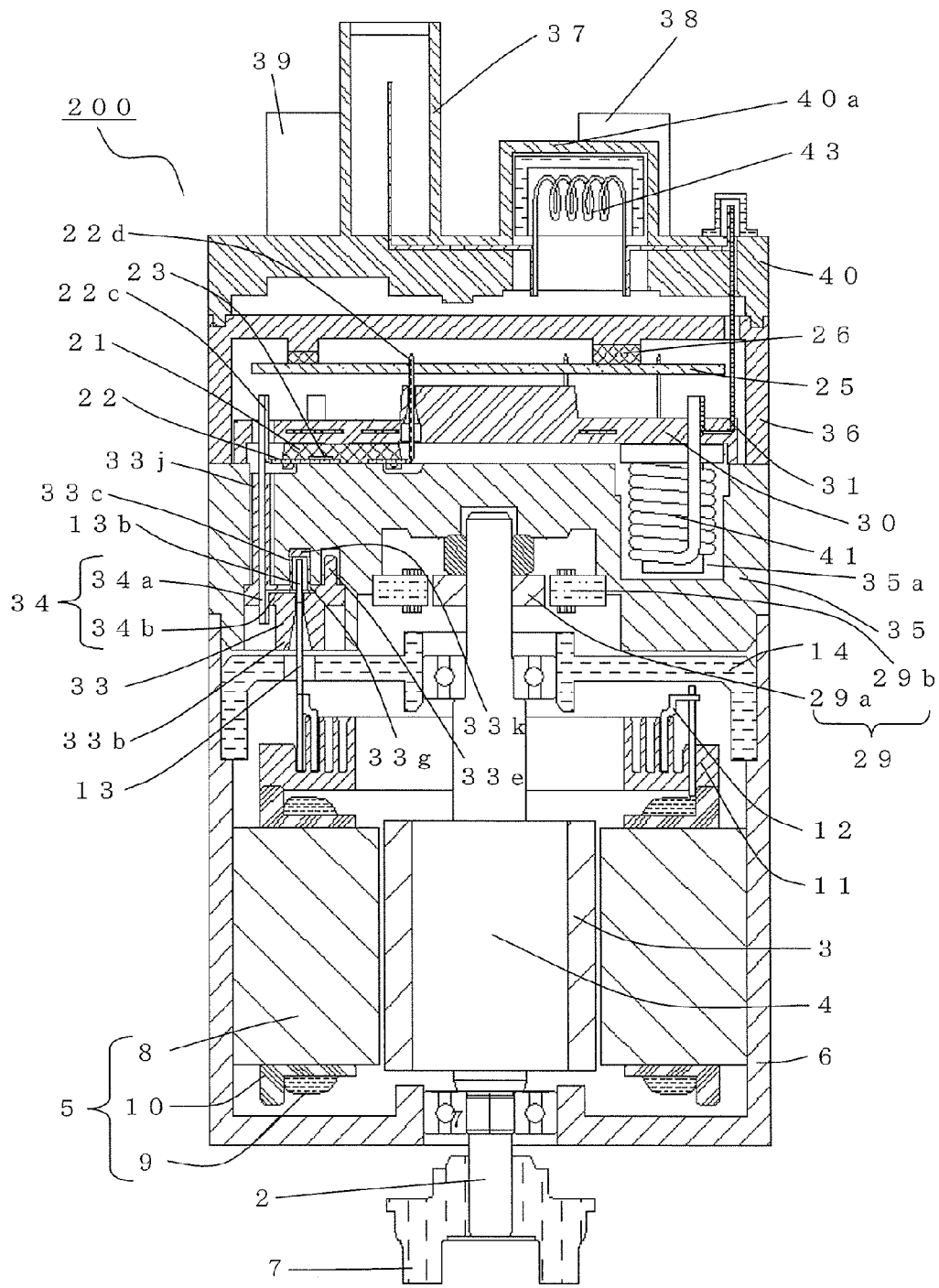
FIG. 13 is a sectional view illustrating an electric driving device according to a second embodiment of the present invention.

In a second embodiment of the present invention, description is given of an electric driving device 200 using an insulating member 33 having a structure different from that of the above-mentioned first embodiment. FIG. 13 is a sectional view illustrating the electric driving device 200 according to the second embodiment of the present invention. Further, FIG. 14 is a sectional view cut along a cross section parallel to an axis line of a rotation shaft 2, for illustrating a state in which a motor terminal 13 and a motor connection terminal 34 are brought into pressure contact with each other according to the second embodiment of the present invention.

Figure 14:
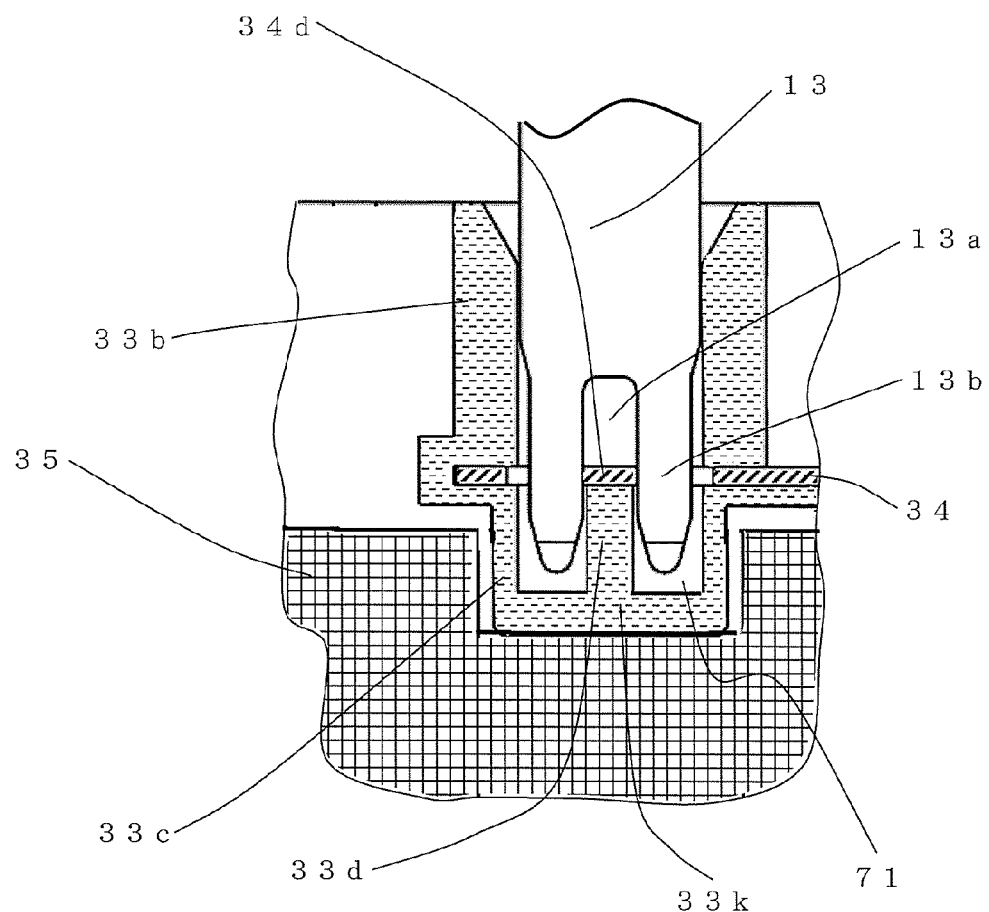
FIG. 14 is a sectional view cut along a cross section parallel to an axis line of a rotation shaft, for illustrating a state in which a motor terminal and a motor connection terminal are brought into pressure contact with each other according to the second embodiment of the present invention.

As illustrated in FIG. 13 and FIG. 14, the insulating member 33 of the electric driving device 200 according to the second embodiment is different from the insulating member 33 described in the above-mentioned first embodiment in such a structure that the end portion of a resin wall 33*c* of the insulating member 33 at a position on an opposite side to an electric motor side is closed by a lid 33*k*. Further, the second embodiment is different from the above-mentioned first embodiment in that, along with this change of the insulating member 33, the end portion of the resin wall 33*c* at the position on the opposite side to the electric motor side is pressed against a heat sink 35. The other structure is similar to that of the electric driving device 100 according to the first embodiment, and detailed description thereof is therefore omitted herein.

Also in the second embodiment, similarly to the above-mentioned first embodiment, at a timing to assemble an electric motor 1 and the heat sink 35 to each other, the motor terminal 13 is inserted into an insertion hole 33*a* of a guide portion 33*b*. Moreover, arm portions 13*b* of the motor terminal 13 are inserted into insertion holes 34*c* of the motor connection terminal 34, respectively. Further, a terminal portion 34*d* of the motor connection terminal 34 is pinched by a slit 13*a* formed in the motor terminal 13, and thus the motor terminal 13 is press-fitted to the motor connection terminal 34.

In this case, the motor connection terminal 34 is pressurized in an insertion direction of the motor terminal 13. In this case, the terminal portion 34*d* of the motor connection terminal 34 is supported by the heat sink 35 through intermediation of a support member 33*d* and the lid 33*k*. Therefore, deformation of the motor connection terminal 34 is suppressed. Further, the insulating member 33 is similarly supported by the heat sink 35, and hence deformation of the insulating member 33 is also suppressed.

Further, as illustrated in FIG. 14, at the end portion of the resin wall 33*c* of the insulating member 33 at the position on the opposite side to the electric motor side, the lid 33*k* is formed by integral molding with a resin. Therefore, the pressure contact portion between the motor terminal 13 and the motor connection terminal 34 is received in a closed space 71 surrounded on its periphery by the insulating member 33, the motor connection terminal 34, and the motor terminal 13.

When the motor terminal 13 and the motor connection terminal 34 are brought into pressure contact with each other, the contact portion may be chipped to generate metal chippings. In the structure of this embodiment, however, the generated metal chippings can be confined in the closed space 71. Therefore, the short-circuit failure due to the metal chippings can be suppressed.

Further, the motor terminal 13 is inserted into the inner side of the resin wall 33c, and is therefore insulated from the metal component on its periphery (heat sink 35).

To sum up the details described above, in the electric driving device 200 according to the second embodiment of the present invention, at the end portion of the resin wall 33c of the insulating member 33 at the position on the opposite side to the electric motor side, the lid 33k is formed by integral molding with a resin. In this state, when the motor terminal 13 is brought into pressure contact with the motor connection terminal 34, the pressure contact portion between the motor terminal 13 and the motor connection terminal 34 is received in a closed space 71 surrounded on its periphery by the insulating member 33, the motor connection terminal 34, and the motor terminal 13.

When the motor connection terminal 34 is press-fitted to the motor terminal 13, the contact portion between both the components may be chipped to generate metal chippings. In the structure of this embodiment, however, the generated chippings can be confined in the closed space 71. Therefore, the short-circuit failure that may be caused by the chippings is suppressed, with the result that the reliability of the electric driving device is further enhanced.

Moreover, the motor terminal 13 is arranged on the inner side of the resin wall 33c and the lid 33k made of an insulating material, and thus the insulating property can be enhanced between the motor terminal 13 and the heat sink 35. As a result, the reliability of the electric driving device is further enhanced.

Further, when the insulating member 33 is fixed to the heat sink 35, the lid 33k is pressed against the heat sink, with the result that the heat sink 35 supports the insulating member 33. Thus, when the motor terminal 13 is inserted into the motor connection terminal 34, the load that may be received by the insulating member 33 can be received by the heat sink 35. As a result, the deformation of the insulating member 33 and the damage thereto can be prevented, and accordingly the easiness of assembling of the electric driving device and the reliability thereof are enhanced.

Further, the support member 33d having a smaller width than the terminal portion 34d of the motor connection terminal 34 is formed on the insulating member 33. The support member 33d is supported by the heat sink 35 through intermediation of the lid 33k. Therefore, when the motor terminal 13 is inserted into the motor connection terminal 34, the load that may be received by the motor connection terminal 34 can be received by the heat sink 35 at a position immediately below the terminal portion 34d without hindering the insertion of the motor terminal 13. As a result, the deformation of the motor connection terminal 34 and the damage thereto can be prevented, and accordingly the easiness of assembling of the electric driving device and the reliability thereof are enhanced.

Third Embodiment

Figure 15:
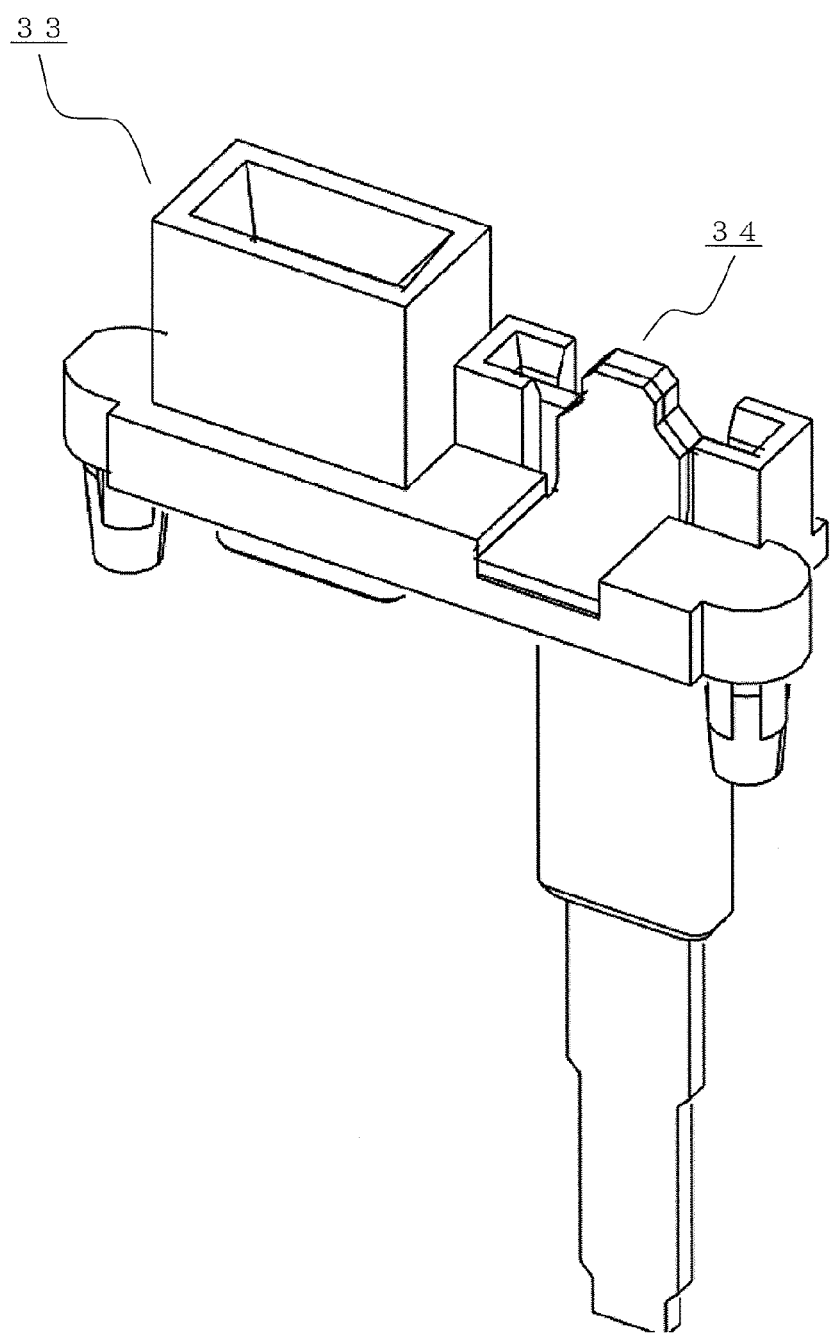
FIG. 15 is a main part perspective view illustrating an insulating member and a motor connection terminal of an electric driving device according to a third embodiment of the present invention.

In a third embodiment of the present invention, description is given of an electric driving device 300 using an insulating member 33 and a motor connection terminal 34 each having a structure different from that of the above-mentioned first embodiment. FIG. 15 is a main part perspective view illustrating the insulating member 33 and the motor connection terminal 34 of the electric driving device according to the third embodiment of the present invention.

The electric driving device 300 according to the third embodiment is different from the electric driving device 100 according to the above-mentioned first embodiment in that the motor connection terminal 34 is inserted into the insulating member 33 and formed by integral molding.

Further, the third embodiment is different from the above-mentioned first embodiment in that, along with this change, the slit 33h of the insulating member 33 is omitted. The other structure is similar to that of the electric driving device 100 according to the above-mentioned first embodiment, and detailed description thereof is therefore omitted herein.

In the third embodiment, the motor connection terminal 34 is formed by insert molding on the insulating member 33 made of an insulating resin. Therefore, when the insulating member 33 is constructed, the motor connection terminal 34 is fixed with the insulating resin. Thus, when a motor terminal 13 is fixed in a state of being press-fitted to the motor connection terminal 34, the load is uniformly applied to the motor connection terminal 34 with balance at the time of press-fitting, and the load that may be received by the motor connection terminal 34 can be received by the entire insulating member 33. As a result, the deformation of the motor connection terminal 34 and the damage thereto can be prevented, and accordingly the reliability of the electric driving device is enhanced.

Further, when the motor connection terminal 34 is formed on the insulating member 33 by insert molding, the position of the motor connection terminal 34 is fixed. Thus, the positional misalignment of the motor connection terminal 34 is suppressed, and accordingly the motor terminal 13 can reliably pinch the motor connection terminal 34. As a result, the easiness of assembling of the electric driving device is enhanced.

Further, when the motor connection terminal 34 is formed on the insulating member 33 by insert molding, the periphery of the motor connection terminal 34 can completely be filled with the resin without the need to use the slit 33h. Therefore, the sealability of a closed space 70 is enhanced, with the result that the reliability of the electric driving device is further enhanced.

Further, the degree of close contact between the motor connection terminal 34 and the insulating member 33 is increased, and thus the heat resistance is reduced between the motor connection terminal 34 and the insulating member 33, with the result that the reliability of the electric driving device is further enhanced.

Moreover, when the motor connection terminal 34 is formed on the insulating member 33 by insert molding, the number of assembling steps is reduced, and the cost can also be reduced.

Fourth Embodiment

Figure 16:
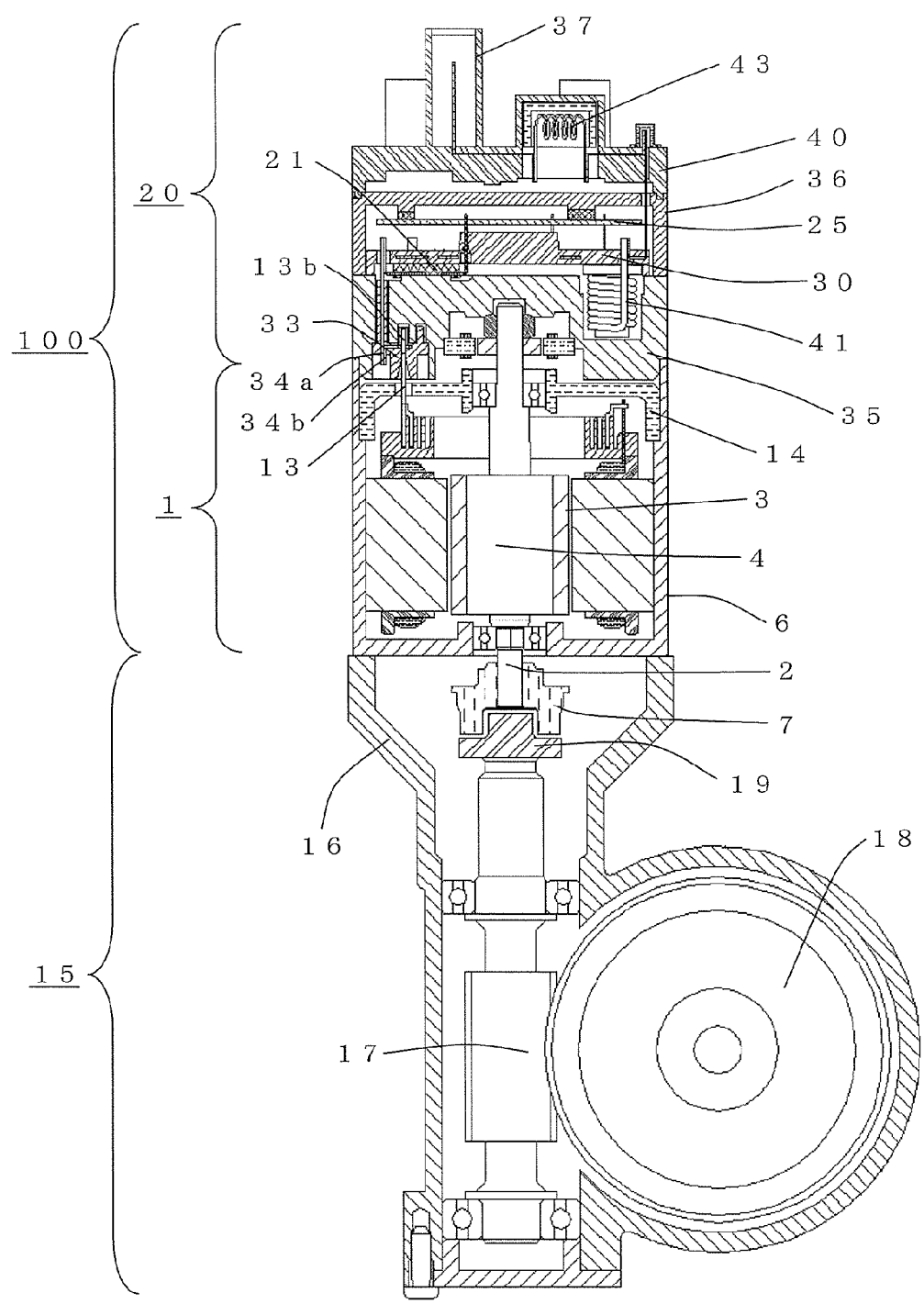
FIG. 16 is a sectional view illustrating an electric power steering device according to a fourth embodiment of the present invention.

In the above-mentioned first to third embodiments, the description is given of the electric driving devices 100, 200, and 300 to be used in the electric power steering devices. In a fourth embodiment of the present invention, referring to FIG. 16, description is given of the electric power steering device having mounted thereon the electric driving device 100 according to the above-mentioned first embodiment among the electric power steering devices having mounted thereon the electric driving devices 100, 200, and 300 according to the above-mentioned first to third embodiments, respectively. FIG. 16 is a sectional view illustrating the electric power steering device according to the fourth embodiment of the present invention.

As illustrated in FIG. 16, the electric power steering device according to the fourth embodiment of the present invention is constructed in such a manner that a speed reducer 15 for reducing the number of rotations of the electric motor 1 is mounted on the electric motor 1 side of the electric driving device 100 according to the above-mentioned first embodiment. More specifically, the electric driving device 100 according to the fourth embodiment is fixed to the speed reducer 15 with screws (not shown) through intermediation of the motor frame 6 of the electric motor 1.

The speed reducer 15 includes a gear case 16, a worm gear 17, and a worm wheel 18. In this case, the gear case 16 is a gear case having the motor frame 6 of the electric motor 1 mounted thereon. Further, the worm gear 17 is a reduction gear provided inside the gear case 16, for decelerating the rotation of the rotation shaft 2. Moreover, the worm wheel 18 meshes with the worm gear 17.

A coupling 19 is fixed to an end portion of the worm gear 17 on the rotation shaft 2 side. Further, the coupling 19 and the coupling 7 are coupled to each other so that the torque is transmitted from the electric motor 1 to the worm gear 17.

To sum up the details described above, in the electric power steering device according to the fourth embodiment of the present invention, the speed reducer 15 for reducing the number of rotations of the electric motor 1 is mounted on the motor frame 6 provided to the electric motor 1 of the electric driving device 100. Therefore, the electric motor 1 heavy in weight is structured to be sandwiched between the control device 20 and the speed reducer 15. As a result, the durability against the vibration of the electric motor 1, that is, the anti-vibration property is enhanced, and accordingly the electric power steering device enhanced in reliability can be obtained.

Further, the speed reducer 15 for reducing the number of rotations of the electric motor 1 is mounted on the motor frame 6 provided to the electric motor 1 of the electric driving device 100. Therefore, the heat generated from the electric motor 1 is released to the frame 6, and is then further released by the speed reducer 15. Thus, the heat releasing performance of the electric power steering device is enhanced. As a result, the temperature rise at the time of heat generation from the electric motor 1 is suppressed, and accordingly the electric power steering device enhanced in reliability can be obtained.

Note that, in the fourth embodiment, the description is given of the case where the speed reducer 15 is mounted on the motor frame 6 that is on the electric motor 1 side of the electric driving device 100 according to the above-mentioned first embodiment. In contrast, FIG. 17 is a sectional view illustrating an electric power steering device according to another mode of the fourth embodiment of the present invention.

Figure 17:
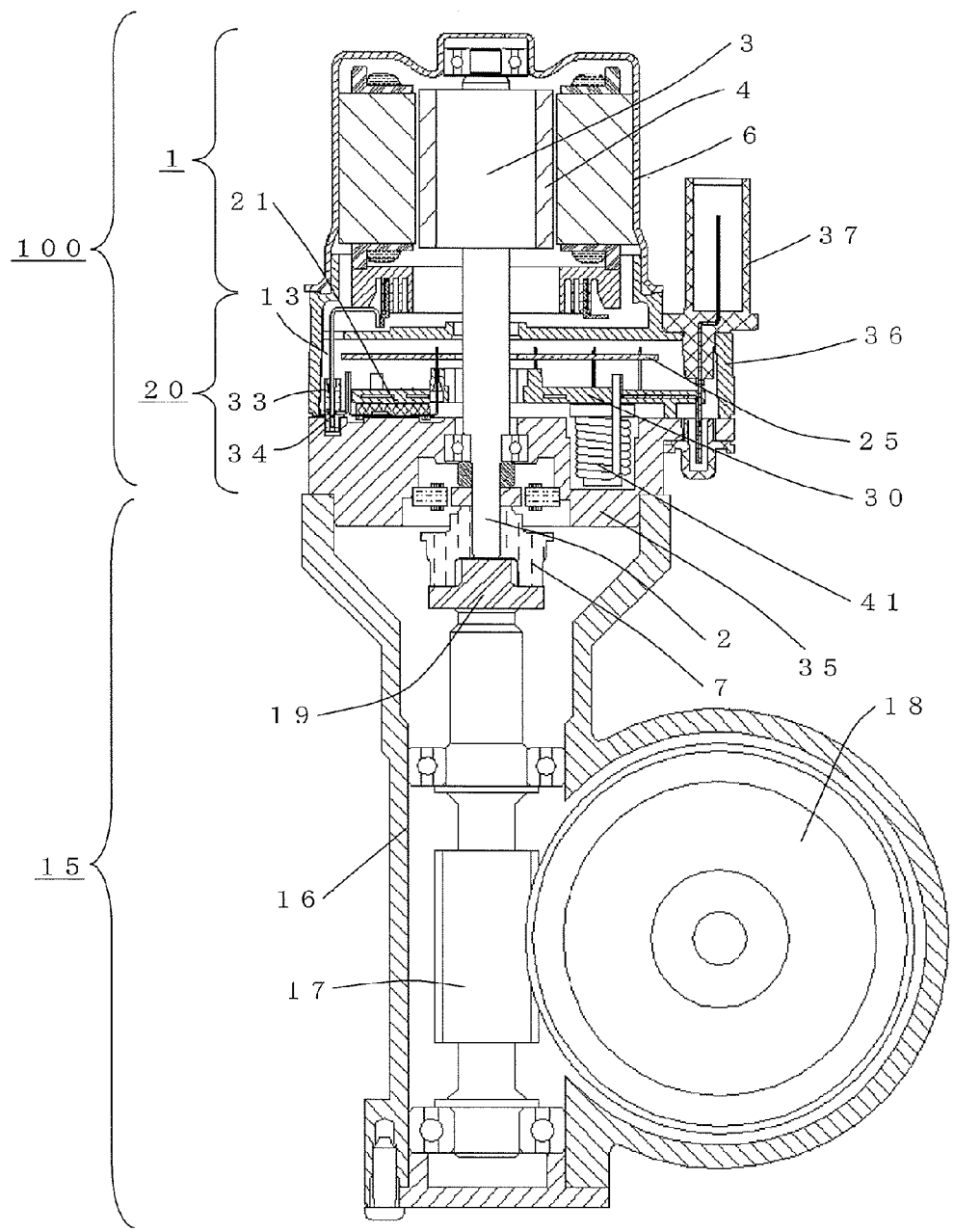
FIG. 17 is a sectional view illustrating an electric power steering device according to another mode of the fourth embodiment of the present invention.

As illustrated in FIG. 17, the speed reducer 15 may be mounted on the control device 20 side, which is opposite to the electric motor 1 side. Specifically, the electric driving device 100 is fixed to the speed reducer 15 with screws (not shown) through intermediation of the heat sink 35 of the control device 20.

In the electric power steering device having the above-mentioned structure, the speed reducer 15 for reducing the number of rotations of the electric motor 1 is mounted on the heat sink 35 provided to the control device 20 of the electric driving device 100. Therefore, the heat generated from the control device 20 (heat generating components (coil 41, capacitor 42, and power modules 21) forming the drive section 61) is released to the heat sink 35, and is then further released by the speed reducer 15.

Thus, the heat generated from the control device 20 is released by the speed reducer 15, and accordingly the heat releasing performance of the electric power steering device is enhanced. Moreover, the temperature rise at the time of heat generation from the control device 20 is suppressed, and accordingly the electric power steering device enhanced in reliability can be obtained.

Note that, in the above-mentioned first to fourth embodiments, the electric motor 1 is described as the brushless motor. However, the electric motor 1 of the present invention is not limited to the brushless motor. For example, the electric motor 1 may be an induction motor or a switched reluctance motor (SR motor).

Further, in the above-mentioned first to fourth embodiments, the description is given of the case where the FET 23b forming the motor relay serving as the switching means for applying and interrupting the motor current IM to be supplied to the electric motor 1 and the shunt resistor 24 for detecting the motor current IM of the electric motor 1 are mounted on the power module 21. However, one or both of the FET 23b and the shunt resistor 24 may be omitted. Further, the relay module 60 may be omitted.

The invention claimed is:
1. An electric driving device, comprising:
an electric motor; and
a control device arranged on an axis line of a rotation shaft of the electric motor, for controlling drive of the electric motor,
the electric motor comprising a motor terminal extending toward the control device in parallel to a direction of the axis line of the rotation shaft and having a slit formed at an end portion of the motor terminal on the control device side,
the control device comprising:
a semiconductor switching element for switching a current of the electric motor;
a heat sink for releasing heat generated from the semiconductor switching element;
a motor connection terminal formed on an extension line of the motor terminal and electrically connected to the semiconductor switching element and the motor terminal; and
an insulating member for holding the motor connection terminal,
the motor connection terminal being pinched by the slit formed in the motor terminal so that the motor terminal is fixed in a state of being press-fitted to the motor connection terminal,
the insulating member comprising a resin wall extending substantially in parallel to the axis line of the rotation shaft, for adjusting a position of the motor terminal with respect to the motor connection terminal by arranging the motor terminal on an inner circumferential side of the resin wall, to thereby fix the insulating member to the heat sink.
2. An electric driving device according to claim 1, wherein the insulating member further comprises a lid portion for closing an end portion of the resin wall at a position on an opposite side to the electric motor side, and
wherein the lid portion is fixed to the heat sink in a state of being pressed against the heat sink.
3. An electric driving device according to claim 1, wherein the insulating member is fixed to the heat sink under a state in which the resin wall and the heat sink form a superimposing portion at which the resin wall and the heat sink are superimposed in a radial direction.

4. An electric driving device according to claim 3, wherein the insulating member further comprises a flange portion to be pressed against the heat sink.

5. An electric driving device according to claim 3,
wherein the heat sink has a recess for receiving the resin wall, and
wherein the superimposing portion is formed by receiving the resin wall in the recess.

6. An electric driving device according to claim 1, wherein the insulating member further comprises a support member for supporting a pressure contact portion between the motor connection terminal and the motor terminal.

7. An electric driving device according to claim 1, wherein the insulating member further comprises a guide portion for inserting the motor terminal into the inner circumferential side along the guide portion.

8. An electric driving device according to claim 1, wherein the insulating member is fixed in a state of being press-fitted to the heat sink.

9. An electric driving device according to claim 1, wherein the insulating member is fixed to the heat sink with an adhesive.

10. An electric driving device according to claim 1, wherein the insulating member further comprises a slit into which the motor connection terminal is inserted.

11. An electric driving device according to claim 1, wherein the motor connection terminal is formed on the insulating member by insert molding.

12. An electric driving device according to claim 1, further comprising a speed reducer mounted on the control device at a position on the opposite side to the electric motor side, for reducing a number of rotations of the electric motor.

13. An electric driving device according to claim 1, further comprising a speed reducer mounted on the electric motor at a position on an opposite side to the control device side, for reducing a number of rotations of the electric motor.

14. A method of manufacturing the electric driving device according to claim 1, the method comprising the steps of:
fixing the insulating member to the heat sink;
inserting the motor terminal along the resin wall so as to adjust the position of the motor terminal with respect to the motor connection terminal; and
pinching the motor connection terminal by the slit formed in the motor terminal so that the motor terminal is fixed in the state of being press-fitted to the motor connection terminal.

* * * * *